United States Patent
Jung et al.

(10) Patent No.: US 9,652,053 B2
(45) Date of Patent: May 16, 2017

(54) METHOD OF DISPLAYING POINTING INFORMATION AND DEVICE FOR PERFORMING THE METHOD

(71) Applicant: SAMSUNG ELECTRONICS CO., LTD., Suwon-si (KR)

(72) Inventors: Han-chul Jung, Seongnam-si (KR); Min-sun Lee, Seoul (KR); Olivia Lee, Seoul (KR); Do-sung Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/550,331

(22) Filed: Nov. 21, 2014

(65) Prior Publication Data

US 2015/0153844 A1 Jun. 4, 2015

(30) Foreign Application Priority Data

Dec. 2, 2013 (KR) ........................ 10-2013-0148785

(51) Int. Cl.
*G06F 3/0354* (2013.01)
*G06F 3/038* (2013.01)
(Continued)

(52) U.S. Cl.
CPC ............ *G06F 3/0354* (2013.01); *G06F 3/038* (2013.01); *G06F 3/0346* (2013.01);
(Continued)

(58) Field of Classification Search
CPC ...... G06F 3/0354; G06F 3/038; G06F 3/0482; G06F 3/0346; G06F 3/0484;
(Continued)

(56) References Cited

U.S. PATENT DOCUMENTS

| 7,443,381 B2 | 10/2008 | Mo |
| 8,089,455 B1 * | 1/2012 | Wieder ................. G06F 3/0386 345/156 |

(Continued)

FOREIGN PATENT DOCUMENTS

| EP | 2613240 A1 | 7/2013 |
| KR | 10-2012-0013727 A | 2/2012 |

OTHER PUBLICATIONS

International Search Report (PCT/ISA/210) issued Feb. 11, 2015 in International Application No. PCT/KR2014/011393.

(Continued)

*Primary Examiner* — Tom Sheng
(74) *Attorney, Agent, or Firm* — Sughrue Mion, PLLC

(57) ABSTRACT

A method for displaying pointing information that enables a user to intuitively determine a pointing position and a moving direction of the point position via a display and a device for performing the method are disclosed. The method includes displaying a plurality of items and selection information which is overlapped with at least a part of a selected item from among the plurality of items on a display, receiving movement information which relates to a remote control apparatus from the remote control apparatus, and if a position on the display which corresponds to the movement information is disposed outside a predetermined region which includes the selected item, modifying the selection information.

30 Claims, 24 Drawing Sheets

(51) Int. Cl.
*H04N 5/445* (2011.01)
*H04N 5/44* (2011.01)
*G08C 17/00* (2006.01)
*H04N 21/422* (2011.01)
*G06F 3/0482* (2013.01)
*G06F 3/0346* (2013.01)
*G06F 3/0484* (2013.01)
*G06F 3/0481* (2013.01)

(52) U.S. Cl.
CPC ........ *G06F 3/0482* (2013.01); *G06F 3/04812* (2013.01); *G06F 3/04842* (2013.01); *G08C 17/00* (2013.01); *H04N 5/4403* (2013.01); *H04N 5/44582* (2013.01); *H04N 21/42204* (2013.01); *H04N 21/42222* (2013.01); *G08C 2201/32* (2013.01)

(58) Field of Classification Search
CPC ............... G06F 3/04842; G06F 3/0481; G06F 3/04812; G06F 3/04817; H04N 5/44582; H04N 5/4403; H04N 21/42204; H04N 21/42222; G08C 17/00; G08C 2201/32
See application file for complete search history.

(56) References Cited

U.S. PATENT DOCUMENTS

| | | | |
|---|---|---|---|
| 8,386,927 | B1 | 2/2013 | Franklin et al. |
| 8,552,975 | B2 * | 10/2013 | Jung ................. H04N 5/44508 345/156 |
| 8,806,376 | B2 * | 8/2014 | Park ................. H04M 1/72544 715/705 |
| 2005/0166162 | A1 * | 7/2005 | Kaneko ............... G06F 3/04812 715/856 |
| 2007/0067744 | A1 * | 3/2007 | Lane .................... G06F 3/0236 715/860 |
| 2010/0107120 | A1 | 4/2010 | Sareen et al. |
| 2010/0199224 | A1 * | 8/2010 | Doerring ............. G06F 3/0236 715/856 |
| 2010/0229128 | A1 * | 9/2010 | Takahashi ............... G06F 3/017 715/858 |
| 2010/0299637 | A1 * | 11/2010 | Chmielewski ........ G06F 3/0482 715/834 |
| 2010/0302274 | A1 | 12/2010 | Lee et al. |
| 2011/0066980 | A1 * | 3/2011 | Chmielewski ........ G06F 3/0482 715/834 |
| 2011/0083108 | A1 | 4/2011 | Klein et al. |
| 2012/0026198 | A1 * | 2/2012 | Maesaka ............... G06F 3/0481 345/660 |
| 2012/0032901 | A1 | 2/2012 | Kwon |
| 2012/0194429 | A1 * | 8/2012 | Kwon ..................... G06F 3/038 345/157 |
| 2013/0093671 | A1 * | 4/2013 | Yoo ....................... G06F 3/0482 345/157 |
| 2013/0179835 | A1 | 7/2013 | Moon et al. |
| 2015/0113483 | A1 * | 4/2015 | Van Der Westhuizen ......... G06F 3/04812 715/850 |

OTHER PUBLICATIONS

Written Opinion (PCT/ISA/237) issued Feb. 11, 2015 in International Application No. PCT/KR2014/011393.
Communication dated May 18, 2015, issued by the European Patent Office in counterpart European Patent Application No. 14194776.2.

* cited by examiner

FIG. 10

| ITEM NAME | LEFT UPPER COORDINATE | RIGHT LOWER COORDINATE |
|---|---|---|
| A | $(x_i, y_j)$ | $(x_{i+4}, y_{j+4})$ |
| B | $(x_i, y_{j+5})$ | $(x_{i+4}, y_{j+9})$ |
| C | $(x_{i+4}, y_{j+9})$ | $(x_{i+8}, y_{j+13})$ |
| ⋮ | ⋮ | ⋮ |

METHOD OF DISPLAYING POINTING INFORMATION AND DEVICE FOR PERFORMING THE METHOD

CROSS-REFERENCE TO RELATED APPLICATIONS

This application claims priority from Korean Patent Application No. 10-2013-0148785, filed on Dec. 2, 2013, in the Korean Intellectual Property Office, the disclosure of which is incorporated herein by reference in its entirety.

BACKGROUND

1. Field

One or more exemplary embodiments relate to an interface between a device and a user, and more particularly, to a method of displaying pointing information on a display of a device and a device configured for performing the method.

2. Description of the Related Art

Pointing information is information which indicates a position on a display of a device which corresponds to a user input based on a pointing user interface.

A conventional pointing user interface includes a cursor interface and a four-direction interface. The cursor interface displays a cursor, as pointing information that changes a display position according to a user input. The four-direction interface displays focus information, as pointing information that changes a display position according to a user input.

The above-described pointing user interfaces makes it difficult to determine an exact display position of pointing information which corresponds to a user input, and/or a moving direction of the pointing information according to the user input.

SUMMARY

One or more exemplary embodiments include a method for displaying pointing information that enables a user to intuitively determine a display position of pointing information which corresponds to a user input and/or a moving direction of the pointing information according to the user input, and a device configured for performing the method.

Additional aspects will be set forth in part in the description which follows and, in part, will be apparent from the description, or may be learned by practice of the presented exemplary embodiments.

According to one or more exemplary embodiments, a method for displaying pointing information includes: displaying, on display, a plurality of items and selection information which overlaps with at least a part of a selected item from among the plurality of items; receiving movement information which relates to a remote control apparatus from the remote control apparatus; and if a position on the display which corresponds to the movement information is disposed outside a predetermined region which includes the selected item, modifying the selection information, wherein the modified selection information includes movement direction information which indicates a moving direction of the position on the display.

The method may further include: changing the position on the display by using the received movement information and information which relates to a reference coordinate of the display.

The modifying the selection information may include: determining whether the position on the display is disposed outside the predetermined region by using layout information which relates to the plurality of items and information which relates to the position on the display.

The modifying the selection information may include: if the position on the display which corresponds to the movement information is disposed inside the predetermined region, displaying the modified selection information which is included in a region that overlaps the predetermined region.

The modifying the selection information may include: changing a display form of the modified selection information by using the predetermined region, a first guide region for determining whether to maintain selection of the selected item, and the position on the display.

The modifying the selection information may include: if the position on the display is disposed outside the first guide region and inside a predetermined region which relates to another item from among the plurality of items, displaying the modified selection information which overlaps with at least a part of the another item.

The modifying the selection information may include: if the position on the display is disposed outside the first guide region and inside a second guide region for determining whether to maintain a selection of another item from among the plurality of items, displaying the modified selection information which is overlaps with at least a part of the another item.

The first guide region may include a partial region outside the predetermined region which includes the selected item, and wherein the second guide region include a partial region inside a predetermined region which relates to the another item.

The movement information may include at least one from among movement change information which relates to the remote control apparatus, 2D coordinate information based on a movement of the remote control apparatus, and a movement sensor value of the remote control apparatus.

According to one or more exemplary embodiments, a device includes: an information receiver configured to receive movement information from a remote control apparatus; a display configured to display a plurality of items; and a controller configured to control the display to display the plurality of items in conjunction with selection information which overlaps with at least a part of a selected item from among the plurality of items, to receive movement information which relates to the remote control apparatus via the information receiver, and, if a position on the display which corresponds to the movement information is disposed outside a predetermined region which includes the selected item, to modify the selection information, wherein the modified selection information includes movement direction information which indicates a moving direction of the position on the display.

According to one or more exemplary embodiments, a non-transitory computer readable recording medium storing one or more programs includes commands for executing a method for displaying pointing information, wherein the pointing user interface method is performed in the same way as the above-described method for displaying the pointing information is performed.

BRIEF DESCRIPTION OF THE DRAWINGS

These and/or other aspects will become apparent and more readily appreciated from the following description of exemplary embodiments, taken in conjunction with the accompanying drawings in which:

FIG. 10 is a table of layout information which relates to a plurality of items stored in a device;

DETAILED DESCRIPTION

Figure 1:
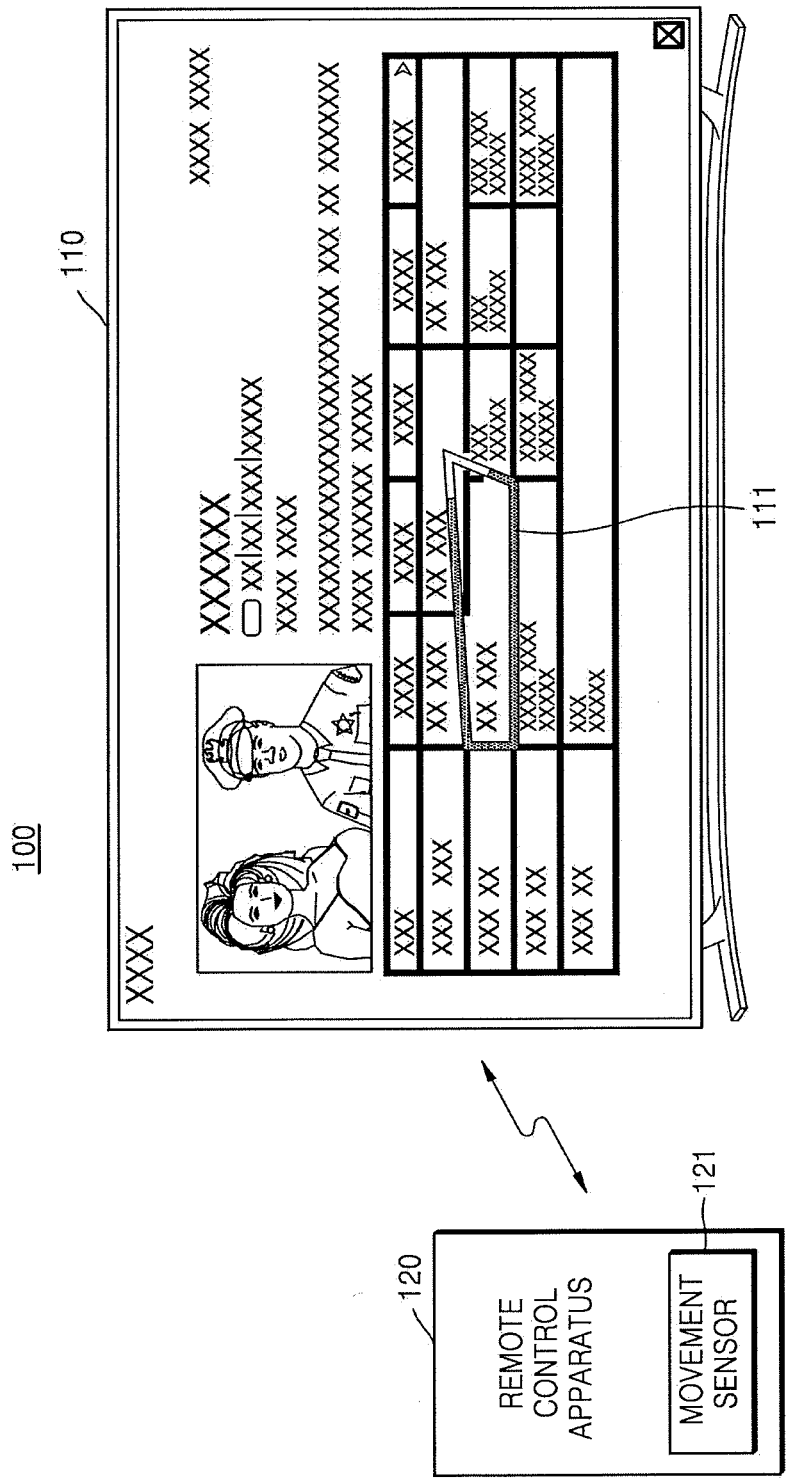
FIG. 1 is a block diagram of a system that is configured to perform a method for displaying pointing information, according to an exemplary embodiment.

The terms used in the exemplary embodiments will be briefly described below before exemplary embodiments are described in greater detail.

Most of the terms used herein are general terms that have been widely used in the technical art to which the exemplary embodiments pertain. However, some of the terms used herein may be created reflecting intentions of technicians in this art, precedents, or new technologies. Further, some of the terms used herein may be arbitrarily chosen by the present applicant. In this case, these terms are defined in detail below. Accordingly, the specific terms used herein should be understood based on the unique meanings thereof and the whole context of the exemplary embodiments.

Throughout the specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Further, the terms, such as 'unit' or 'module', etc., should be understood as an entity that processes at least one function or operation and that may be embodied as hardware, software, or a combination of hardware and software.

Throughout the specification, movement information is a user input used to display pointing information according to one or more of the exemplary embodiments. The movement information may be received from a remote control apparatus as movement information which relates to the remote control apparatus, but is not limited thereto. For example, the movement information may be detected from an image related to the remote control apparatus which image is captured by using a camera included in a device. When the image related to the remote control apparatus is used, the movement information may be detected by comparing images related to the remote control apparatus which images are captured by the camera at different times, but the movement information is not limited thereto. The remote control apparatus is a control device which is capable of controlling the device.

Throughout the specification, a position on a display is a position on the display of a device which corresponds to the movement information of the remote control apparatus. Throughout the specification, a position region, which is a region set as the position on the display of the device which corresponds to the movement information which relates to the remote control apparatus as a center, is a virtual region. The position on the display may include a position on the display which is changed by the device according to the movement information which relates to the remote control apparatus.

Throughout the specification, selection information or modified selection information is feedback information which is displayed on the display of the device according to the movement information which relates to the remote control apparatus. The selection information is information which indicates that an item displayed on the display has been selected. The modified selection information is selection information which has been modified according to the position on the display which corresponds to the movement information which relates to the remote control apparatus. The modified selection information may include at least a part of the selection information which has been modified according to the position on the display which corresponds to the movement information which relates to the remote control apparatus. The modified selection information may include movement direction information which indicates a moving direction of a position on the display so as to select an item which is different from a currently selected item. A user may predict the moving direction of the position on the display which corresponds to the movement information which relates to the remote control apparatus based on movement direction information included in the modified selection information, or based on an item that is to be selected next. The movement direction information may be track information which relates to the position on the display which corresponds to the movement information of the remote control apparatus. The movement direction information may be based on a changed position on the display according to the movement information of the remote control apparatus. Throughout the specification, pointing information may include the selection information and/or the modified selection information.

Throughout the specification, a predetermined region of an item is a display region on a display of a device which includes an image of the item. The predetermined region of the item may be set based on a boundary line of a selected item or an outline of a selected item. The predetermined region of the item may be, for example, a display region on the display of the device which includes the image of the item based on an outline ±n (n is an integer equal to or greater than one) pixel of the item, but is not limited thereto. The predetermined region of the item may be a frame of the item. The predetermined region of the item may vary according to a display size of an image which expresses the item.

Throughout the specification, a guide region of a selected item, which is a region used to determine whether to maintain a selection which relates to the selected item, is a virtual region. Throughout the specification, a guide region of a non-selected item, which is a region used to determine whether to select the non-selected item, is a virtual region.

The above-described movement information, pointing information, the position on the display, position region, selection information, modified selection information, movement direction information, the predetermined region of the item, and guide regions are used as terms for explaining the exemplary embodiments. However, the terms may be defined as different terms reflecting intentions of technicians in this art, precedents, or new technologies, and thus the specific terms used herein should be understood based on the unique meanings thereof and the whole context of the exemplary embodiments.

Reference will now be made in detail to exemplary embodiments, examples of which are illustrated in the accompanying drawings. In this regard, the exemplary embodiments may have different forms and should not be construed as being limited to the descriptions set forth herein. In the following description, well-known functions or constructions are not described in detail since they would obscure the exemplary embodiments with unnecessary detail. Like reference numerals refer to like elements throughout. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a system 100 that is configured to perform a method for displaying pointing information, according to an exemplary embodiment. Referring to FIG. 1, the system 100 includes a device 110 and a remote control apparatus 120. The system 100 is not limited to that shown in FIG. 1. For example, the system 100 may further include at least one of a settop box, a home gateway, an access point (AP), and a home server.

The device 110 and the remote control apparatus 120 may transmit data based on wireless communication. The data transmitted from the remote control apparatus 120 to the device 110 may include a control signal for controlling an operation of the device 110. Wireless communication may include at least one of WiFi Direct (WFD) communication, Bluetooth (including low power Bluetooth) communication, and Infrared Data Association (IrDA), but is not limited thereto. The control signal may include movement information as described above with respect to the exemplary embodiments.

The device 110 may include a communication-enabled and remotely controllable device, but is not limited thereto. In particular, the device 110 may include a device that may display a plurality of items on a display, and may perform a pointing information display function (or a pointing user interface) that may overlap and display an image of a selected item and pointing information 111 which includes selection information and/or modified selection information according to exemplary embodiments based on the movement information received from the remote control apparatus 120.

The device 110 may include at least one of, for example, a smart television, a mobile terminal, a personal computer (PC), a tablet, a consumer electronic (CE) terminal that may display an image, and a navigation terminal, but the device 110 is not limited thereto.

The plurality of items displayed on the display of the device 110 may include an item included in a platform that may select diverse contents, such as, for example, any one or more of a real-time broadcasting program, a movie, an application, a personal photo, etc., but the plurality of items are not limited thereto. For example, the plurality of items may include icons a screen of a smart television. The plurality of items may include a screen item or a screen object such that the plurality of items are displayed on the display of the device 110.

The plurality of items may include at least one of a menu item for executing a function, a menu item for selecting a content, a menu item for setting a operation condition, and a menu item for selecting a category, but the item is not limited thereto.

The menu item for executing the function may include, for example, an icon of an application set in the device 110. The application may include, for example, any one or more of an application for providing a service such as Facebook, a fitness schedule, a camera, a singing room, etc., but the application is not limited thereto.

The menu item for selecting the content may include, for example, any one or more of a menu item for reproducing a moving image (for example, a movie) that a user wants to view, a menu item for reproducing a real-time broadcasting program that the user wants to view, and/or a menu item for reproducing music that the user wants to listen to, but the menu item for selecting the content is not limited thereto.

The menu item for setting the operation condition may include, for example, any one or more of a menu item such as a volume control of the device 110, a screen brightness control, a channel setting, etc., but the menu item for setting the operation condition is not limited thereto.

The menu item for selecting the category may include, for example, any one or more of a menu item for selecting content for each category such as real-time TV broadcasting, a video on demand (VOD), an App., Internet, etc., via a single screen, but the menu item for selecting the category is not limited thereto.

The above-described menu items may include summary information from which the user may determine content of the menu items. The summary information may include, for example, any one or more of a thumbnail, a symbol image, a title, a name of an item, and date information, but the summary information is not limited thereto.

FIGS. 2A, 2B, 2C, 2D, 2E, and 2F illustrate examples of arrangements of a plurality of items that may be displayed on a display of the device 110.

Figure 2A:
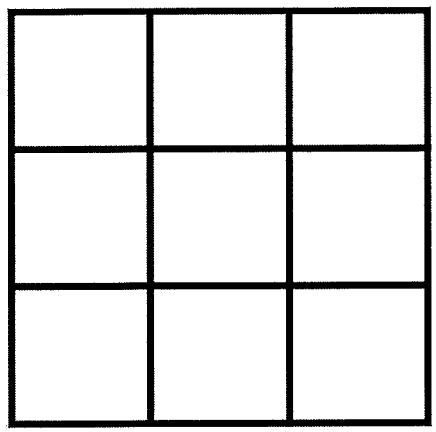
FIGS. 2A, 2B, 2C, 2D, 2E, and 2F illustrate examples of arrangements of a plurality of items that may be displayed on a display of a device.

FIG. 2A shows an example of a two-dimensional (2D) arrangement of the plurality of items. Nine (9) items shown in FIG. 2A include 3×3 uniform display regions (or grid regions). The plurality of items that may be displayed on the display of the device 110 are not limited to those shown in FIG. 2A. For example, the plurality of items that may be displayed on the display of the device 110 may include non-uniform display regions. The nine items shown in FIG. 2A have a structure in which boundary sides of the nine items contact each other. However, the plurality of items may have a structure in which boundary sides of the plurality of items do not contact each other. For example, as shown in FIG. 2F that will be described later, the plurality of items may be displayed at separate positions on the display of the device 110.

Figure 2B:
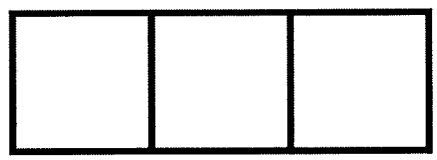
Figure 2C:
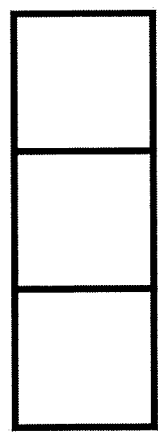

The plurality of items may be arranged in a horizontal orientation as shown in FIG. 2B. The plurality of items may be arranged in a vertical orientation as shown in FIG. 2C. The plurality of items arranged in the horizontal orientation of FIG. 2B or in the vertical orientation of FIG. 2C include uniform display regions. However, when the plurality of items are arranged in the horizontal orientation of FIG. 2B or in the vertical orientation of FIG. 2C, the plurality of items may include non-uniform display regions, and may be displayed at separate positions on the display of the device 110, as shown in FIG. 2F.

Figure 2D:
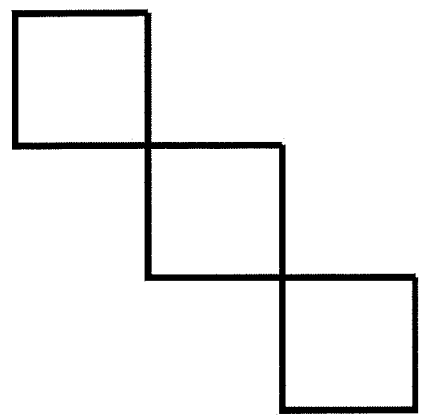
Figure 2E:
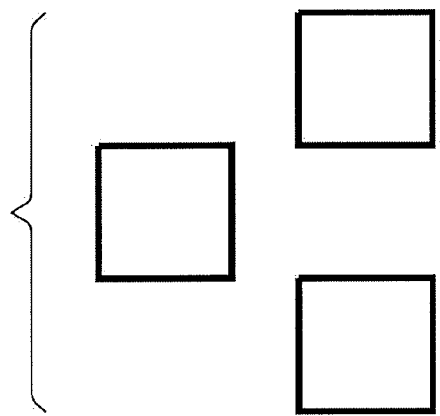
Figure 2F:
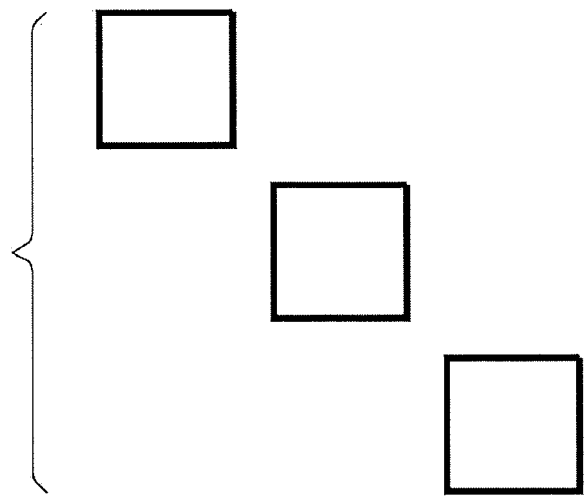

The plurality of items may be arranged in a diagonal line, as shown in FIG. 2D or FIG. 2F. The plurality of items may be arranged in a triangular configuration, as shown in FIG. 2E. Although not shown in FIGS. 2A though 2F, the plurality of items may be randomly arranged and may have uniform sizes or non-uniform sizes on the display of the device 110.

The items that may be displayed on the display of the device 110 are not limited to rectangular shapes as shown in FIGS. 2A though 2F. For example, the items may be displayed having circular shapes or unfixed shapes on the display of the device 110. The plurality of items may be displayed having different shapes. For example, one of the items displayed on the display of the device 110 may have a rectangular shape, another one may have a circular shape, and another one may have a diamond shape, but a shape of the item is not limited thereto.

FIGS. 3A, 3B, 3C, 3D, 3E, 3F, and 3G illustrate examples of pointing information 301, 314, 315, 316, 322, 332, 342, 352, and 362 that may be displayed on a display of the device 110, according to an exemplary embodiment.

Figure 3A:
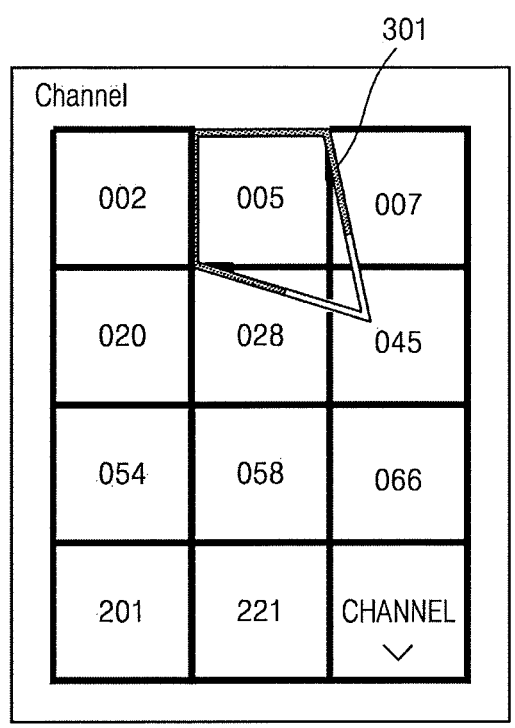
FIGS. 3A, 3B, 3C, 3D, 3E, 3F, and 3G illustrate examples of pointing information that may be displayed on a display of a device, according to an exemplary embodiment.
Figure 3B:
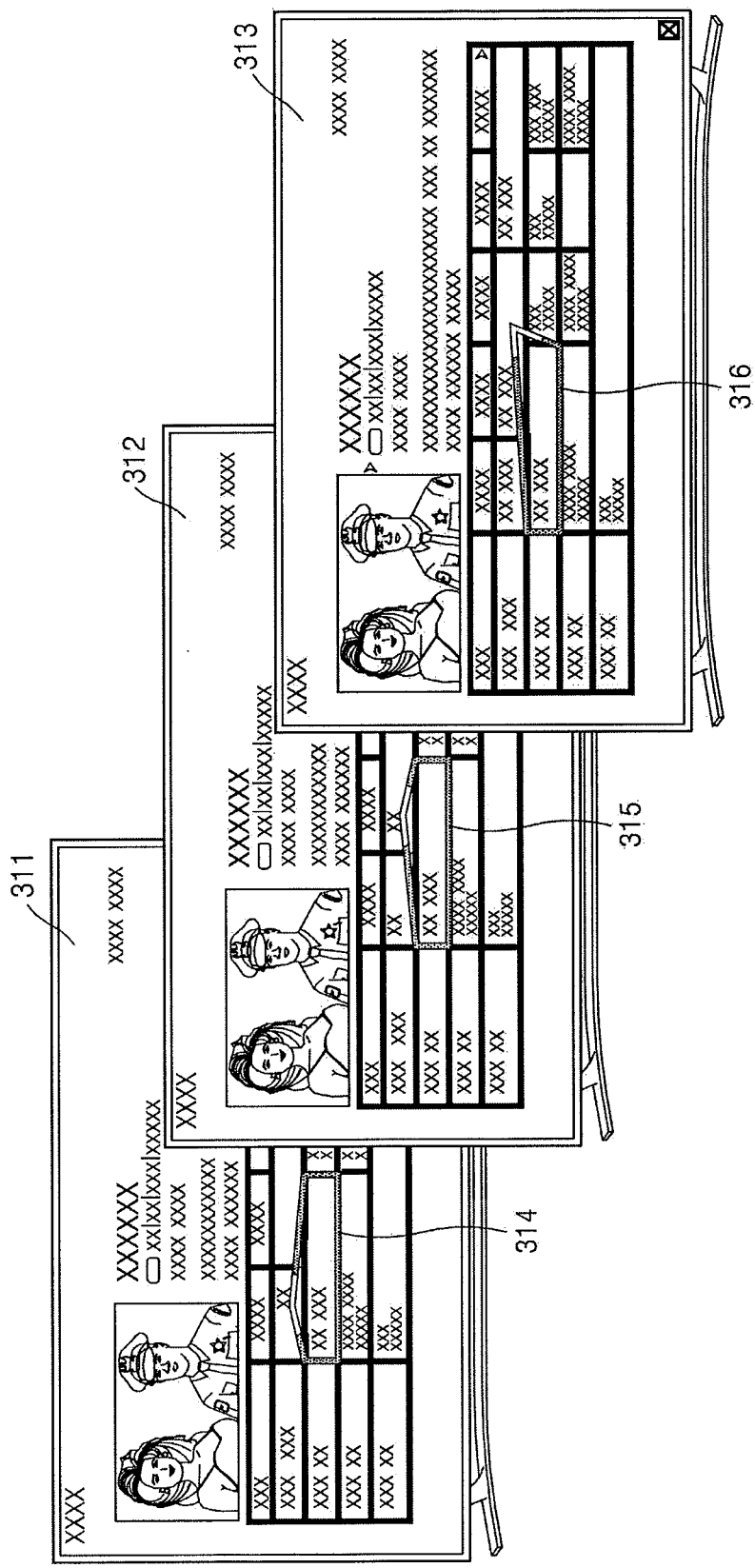
Figure 3C:
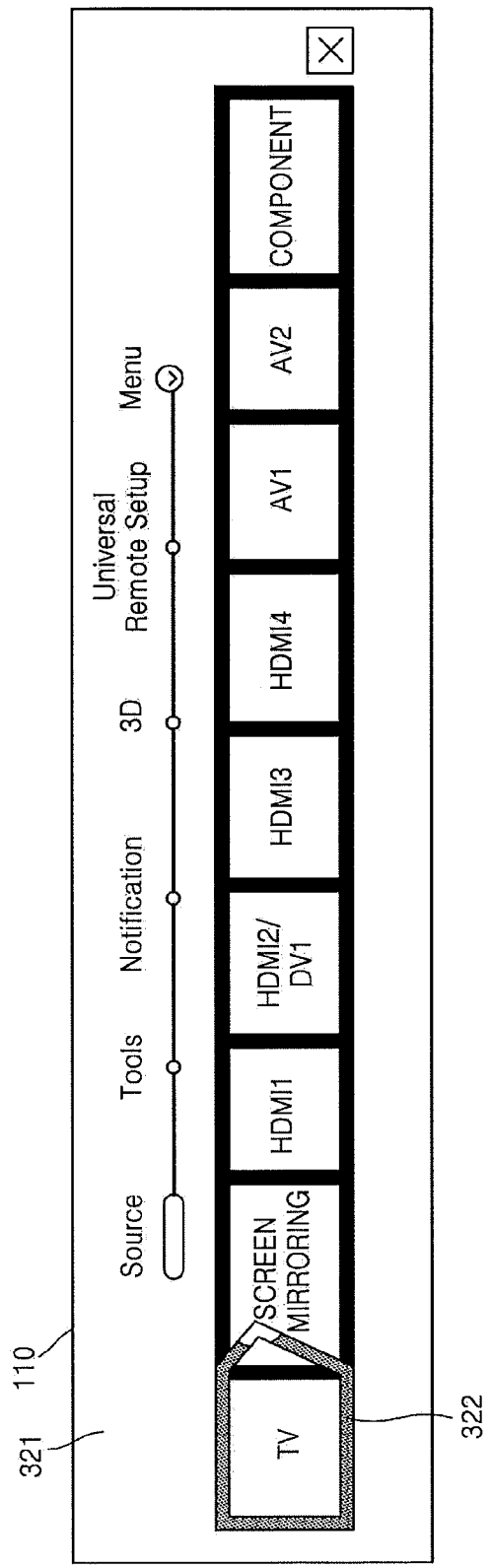
Figure 3D:
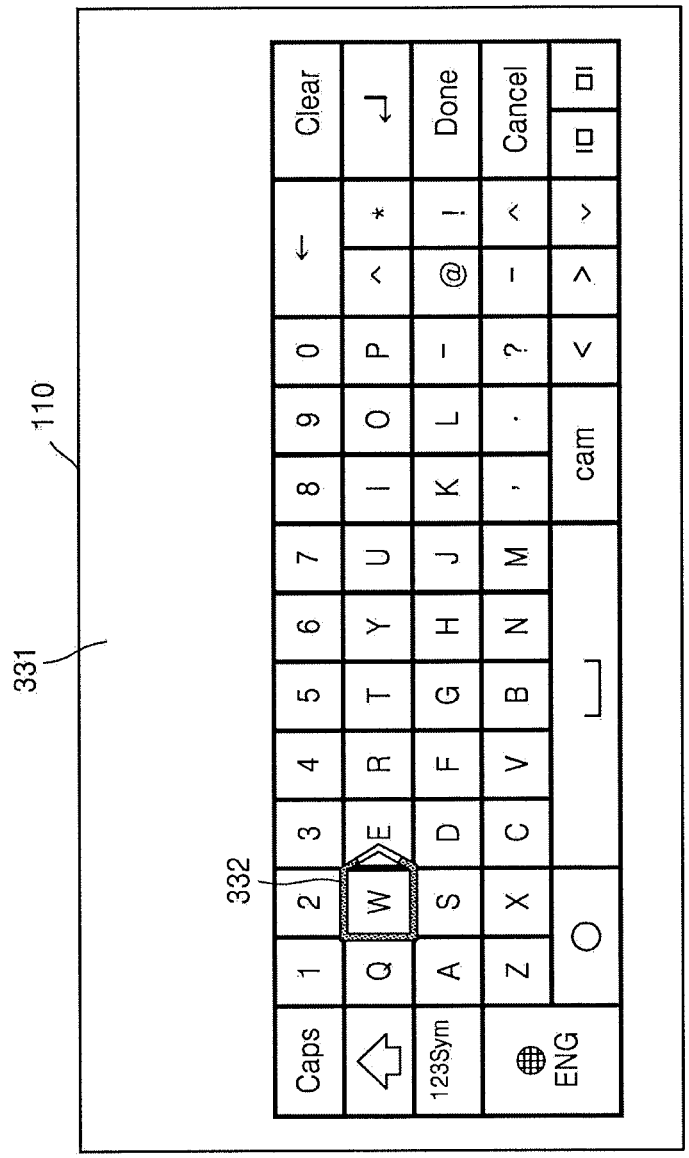
Figure 3E:
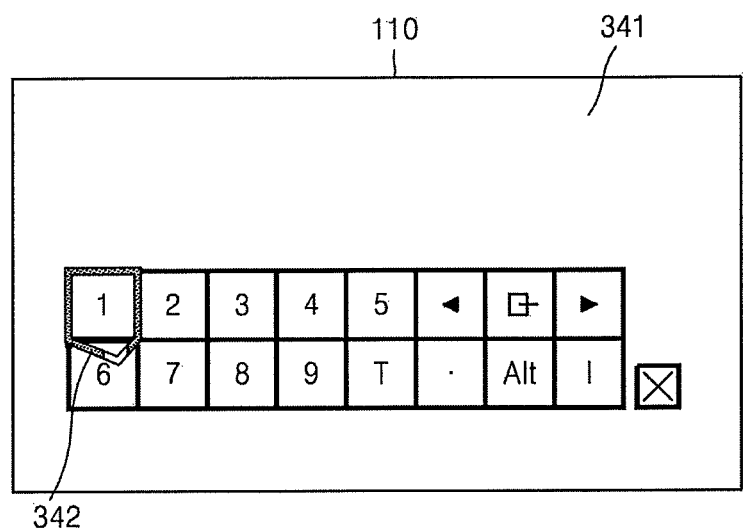
Figure 3F:
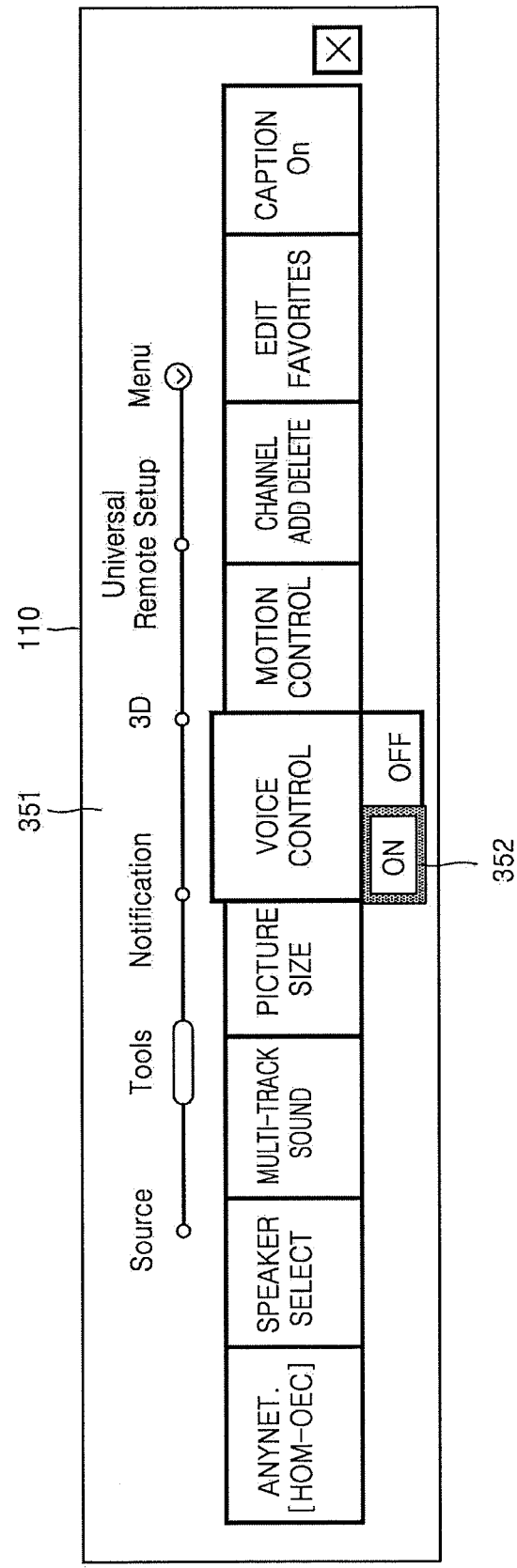
Figure 3G:
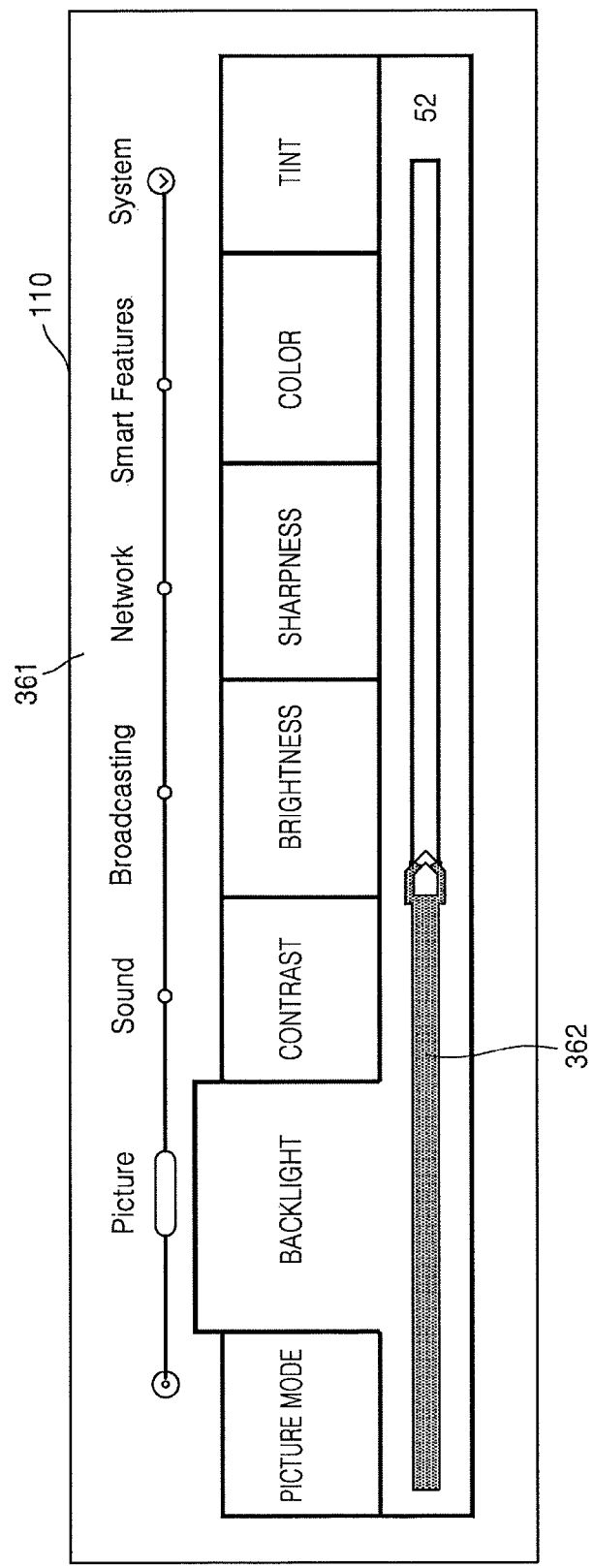

FIGS. 3A through 3G illustrate a case in which a position on the display of the device 110 which corresponds to movement information of the remote control apparatus 120 is disposed outside a predetermined region of a selected item. The position on the display of the device 110 may be changed by using the movement information received from the remote control apparatus 120. FIG. 3F illustrates a case in which the position on the display of the device 110 is disposed inside the predetermined region of the selected item. FIG. 3G illustrates a case in which the position on the display of the device 110 is included in a predetermined region of an item for which a corresponding image indicates directionality.

The pointing information 301, 314, 315, 316, 322, 332, 342, 352, and 362 shown in FIGS. 3A through 3G will now be described in more detail below.

FIG. 3A shows a case in which a plurality of items displayed on the display of the device 110 includes a plurality of pieces of channel information. Referring to FIG. 3A, the pointing information 301 displayed on the display of the device 110 includes movement direction information which indicates a moving direction of a position on the display so as to select an item of a channel 045 by modifying a part of selection information which relates to an item of a channel 005. The moving direction of the position on the display is based on a changed position on the display according to the movement information which relates to the remote control apparatus 120. The pointing information 301 illustrated in FIG. 3A may include modified selection information. The item of the channel 045 is disposed on a diagonal line with respect to the item of the channel 005. A user may predict that a channel of the device 110 may be changed from the channel 005 to the channel 045 based on the pointing information 301 illustrated in FIG. 3A.

A bright part of the pointing information 301 may be the movement direction information. The movement direction information may be displayed as a highlight image or a glow effect image such that the movement direction information included in the modified selection information may be easily distinguished from remaining information other than the movement direction information (hereinafter referred to as the remaining information), but a method for displaying the movement direction information is not limited thereto. The movement direction information and the remaining information may be displayed by using differently colored highlighted images in the exemplary embodiments. The remaining information may include information from among the selection information that has been partially changed.

The selection information and/or the modified selection information may be displayed as images that may easily distinguish a non-selected item from a selected item in the exemplary embodiments. For example, the selection information and/or the modified selection information may be displayed as color images (for example, blue, yellow, red, etc.) that may be easily recognized by the user, but a method for displaying the selection information and/or the modified selection information is not limited thereto.

The movement direction information may be displayed as a line having a gradually differing thickness. For example, the movement direction information may be displayed as a line having a thickness that is gradually becoming thinner as a position on the display moves away from the predetermined region of the selected item. The movement direction information may be displayed as a line having a thickness that is gradually becoming thicker as a position on the display moves away from the predetermined region of the selected item. The movement direction information may be displayed as a line having a thickness which is different from that of a line indicating the remaining information. The movement direction information may be displayed as a broken line or as a dot-and-dash line, but a display line for the movement direction information is not limited thereto. A display shape of the movement direction information may be set by the user, or may be preset in the device 110.

FIG. 3B shows a case in which a plurality of items displayed on the display of the device 110 includes electronic program guide information. Referring to FIG. 3B, display regions of the displayed plurality of items are non-uniform. As shown in screens 311, 312, and 313 of FIG. 3B, the pointing information 314, 315, and 316 includes different movement direction information according to the position on the display disposed outside the predetermined region of the selected item. In particular, the pointing information 314, 315, and 316 displayed on the screens 311, 312, and 313 of FIG. 3B includes different movement direction information having a position on the display which corresponds to movement information of the remote control apparatus 120 as an apex. Thus, the user may predict a next selectable item according to the movement direction information displayed with respect to the selected item.

FIG. 3C shows a case in which a plurality of items includes menu items displayed in a horizontal orientation, similarly as shown in FIG. 2B. Referring to FIG. 3C, the pointing information 322 including movement direction information having a position on the display disposed outside a predetermined region of an item (TV) included in the screen 321 displayed on the display of the device 110 as an apex is displayed.

An item "TV" that is a leftmost item is selected in FIG. 3C. When the pointing information 322 includes the movement direction information having a position on the display of the device 110 corresponding to movement information of the remote control apparatus 120 as the apex as shown in FIG. 3C, a selectable item may be predicted as screen mirroring. In FIG. 3C, the selectable item according to the movement information of the remote control apparatus 120 may include an item such as, for example, any one of high definition multimedia interface 1 (HDMI1), HDMI2/digital video 1 (DV1), etc. which are disposed along the same horizontal direction as the screen mirroring, but the selectable item is not limited thereto.

Unlike FIG. 3C, when the selected item is the screen mirroring, pointing information which includes movement direction information indicating that the TV or the HDMI1 is predicted as a next selectable item may be displayed on the display of the device 110.

FIG. 3D shows a case in which a plurality of items includes keys which are included in a virtual keyboard. The pointing information 332 included in a screen 331 of FIG. 3D includes movement direction information indicating a moving direction of a position on the display so as to select a key "E" by modifying a part of selection information indicating a selection of a key "W". A user may intuitively know information which relates to a currently selected key and information which relates to a next selectable key by viewing the screen 331 of FIG. 3D.

FIG. 3E shows a case in which a plurality of items include a plurality of number keys. Referring to FIG. 3E, a screen 341 which shows the pointing information 342 including movement direction information which indicates a moving direction of a position on the display so as to select a key "6" by modifying a part of selection information which indicates a selection of a key "1" is displayed on the display of the device 110. A user may intuitively know, via the screen 341 of FIG. 3E, that the key "1" is a currently selected key, and a key "6" is a next selectable key.

FIG. 3F shows a case in which menu items of a lower layer of a selected item are selected. The menu items of the lower layer of the selected item include two items. The two menu items are disposed in a horizontal orientation, similarly as shown in FIG. 2B. A position on the display according to the movement information of the remote control apparatus 120 is included in a predetermined region of a left menu item.

In this case, the pointing information 352 which includes selection information may be displayed on the display of the device 110 as shown in a screen 351 of FIG. 3F. When the menu items of the lower layer are selected as shown in FIG. 3F, a display size of an item of an upper layer of the selected item may expand such that the item of the upper layer may be distinguished from other items, but a method for distinguishing between the upper layer and other items is not limited thereto. For example, a color image of the item of the upper layer may have a different color from color images of other items.

FIG. 3G shows a case in which a menu item for setting an operating condition (for example, a screen brightness control, a contrast control, etc.) of the device 110 is selected. In FIG. 3G, a predetermined region of an item of a lower layer of a selected menu item is displayed having a shape which indicates directionality. In particular, a screen 361 including the pointing information 362 which includes movement direction information displayed on a part of the predetermined region of the item of the lower layer is displayed on the display of the device 110 according to a position of the display which corresponds to movement information of the remote control apparatus 120.

The examples of displaying the pointing information which includes the selection information and/or the modified selection information according to the exemplary embodiments are not limited to those shown in FIGS. 3A through 3G. The pointing information 301, 314, 315, 316, 322, 332, 342, and 362 shown in FIGS. 3A through 3E and 3G may include the modified selection information. The pointing information 352 of FIG. 3F may include the selection information.

FIGS. 4A, 4B, 4C, and 4D illustrate examples of displaying pointing information 401, 404, 407, 410, 413, 416, 419, 422, 425, 428, 431, 434, 437, 440, 444, 448, 452, 456, 460, 464, 468, 472, 476, 480, 484, and 488 based on one item, according to exemplary embodiments.

Figure 4A:
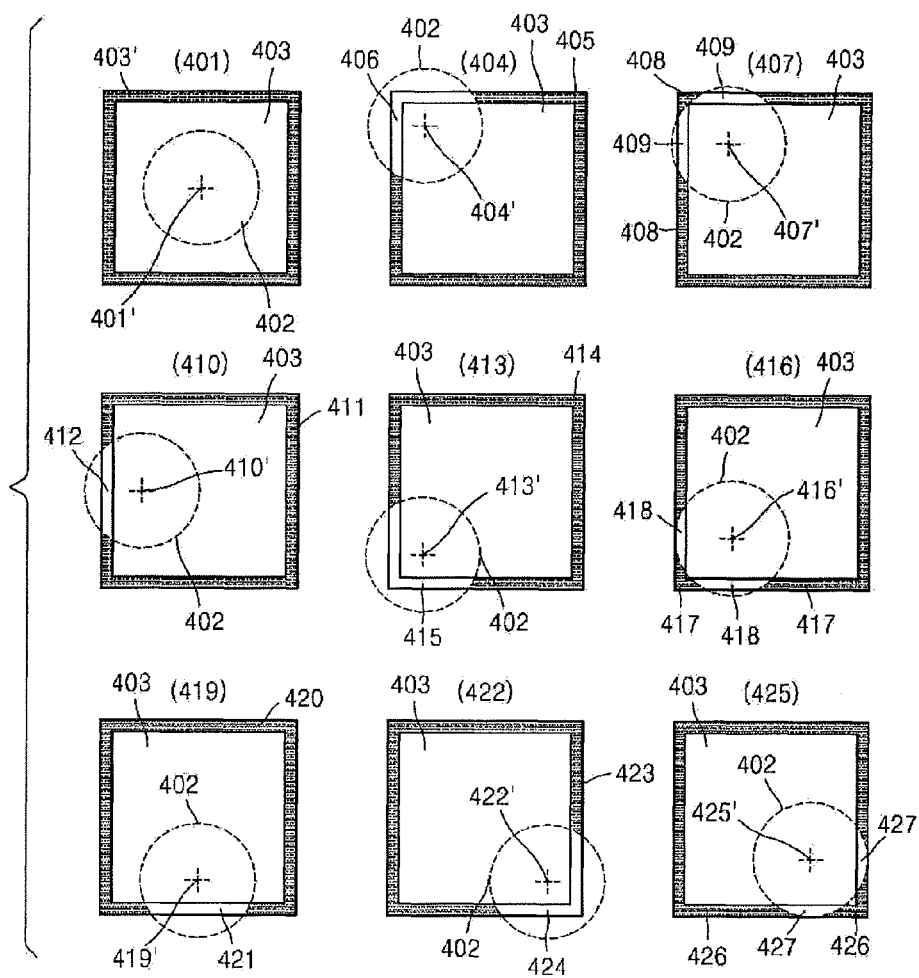
FIGS. 4A, 4B, 4C, and 4D illustrate examples of displaying pointing information based on one item, according to exemplary embodiments.
Figure 4B:
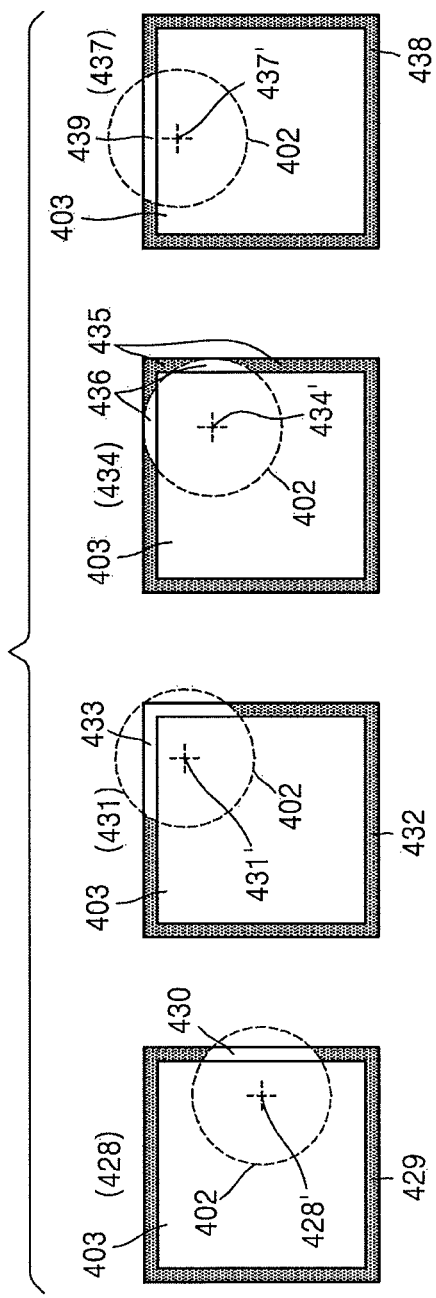

FIGS. 4A and 4B show examples of displaying the pointing information 401, 404, 407, 410, 413, 416, 419, 422, 425, 428, 431, 434, and 437 in which a position 401', 404', 407', 410', 413', 416', 419', 422', 425', 428', 431', 434', or 437' on a display of the device 110 which corresponds to movement information of the remote control apparatus 120 is disposed inside a predetermined region 403 of a selected item. The pointing information 401 of FIG. 4A includes selection information 403' as described above with respect to the exemplary embodiments. The pointing information 404, 407, 410, 413, 416, 419, 422, 425, 428, 431, 434, and 437 of FIGS. 4A and 4B includes movement direction information 406, 409, 412, 415, 418, 421, 424, 427, 430, 433, 436, and 439, as described above with respect to the exemplary embodiments.

In the pointing information 401, a position region 402 on the display of the device 110 is included in the predetermined region 403 of the selected item. Thus, the pointing information 401 includes the selection information 403' and does not include modified selection information, since the selection information 403' is not changed according to a position 401' on the display of the device 110 which corresponds to the movement information of the remote control apparatus 120.

The selection information 403' included in the pointing information 401 may be displayed by overlapping the selection information 403' with a part of the predetermined region 403 of the selected item. The part of the predetermined region 403 of the selected item may include a part based on a boundary line of the selected item or an outline of the selected item, but the part of the predetermined region 403 of the selected item is not limited thereto. For example, the selection information 403' may be displayed by not overlapping with an image of the selected item at a position adjacent to the outside of the predetermined region 403 of the selected item, or may be displayed by overlapping with the image of the selected item at a position adjacent to the inside of the predetermined region 403 of the selected item. The selection information 403' may be displayed to be transparent so as not to hide the image of the selected item.

The position region 402 is a region within which the position 401', 404', 407', 410', 413', 416', 419', 422', 425', 428', 431', 434', or 437' is centered. The position region 402 may be determined according to the position. The position region 402 may be generated by a value which is preset in the device 110. The position region 402 is a virtual region and thus may be a virtual position region. The value which is preset in the device 110 regarding the position region 402 may include size information (for example, radius information) which relates to the position region 402, but the value preset in the device 110 is not limited thereto. The position region 402 may be generated as a circular shape, but a shape of the position region 402 is not limited thereto. For example, the position region 402 may be generated as any one of a rectangular shape, a diamond shape, a hexagonal shape, a pentagonal shape, etc. A shape and size of the position region 402 may be set as default in the device 110, or may be changed or set by a user. The position region 402 may not be displayed on a display of the device 110, but a display condition of the position region 402 is not limited thereto. For example, the position region 402 may be selectively displayed on the display of the device 110. Selective displaying of the position region 402 may be controlled or set by the user.

The device 110 may check an overlapping state between the predetermined region 403 and the position region 402 of the selected item. For example, the overlapping state may be checked by using 2D coordinate information on a screen with respect to the predetermined region 403 of the selected item and 2D coordinate information on a screen with respect to the position region 402. The 2D coordinate information on the screen may be expressed as a value (x,y) and may include image coordinate information. The position region 402 and the predetermined region 403 do not overlap in the pointing information 401.

In the point information 404, a position 404' on the display of the device 110 which corresponds to the movement information of the remote control apparatus 120 is disposed inside the predetermined region 403 of the selected item, and a partial region of the predetermined region 402 goes beyond or overlaps with a partial section based on an left upper corner of the predetermined region 403 of the selected item.

The pointing information 404 includes the movement direction information 406 which overlaps with a part of the predetermined region 403 of the selected item and remaining information 405 except for the movement direction information 406 which is included in the pointing information 404. The remaining information 405 may include selection information from among existing selection information for which a display shape is not changed. The pointing information 404 may be combined information from among the remaining information 405 and the movement direction information 406. The movement direction information 406 included in the pointing information 404 may be identical to a part of the selection information that overlaps with the predetermined region 403 in a part where the predetermined region 403 and the position region 402 overlap each other. Thus, the movement direction information 406 included in the pointing information 404 is displayed on a partial section of an outline of the left upper corner of the predetermined region 403 of the selected item. The remaining information 405 is displayed on a section of the outline of the predetermined region 403 other than the partial section of the outline of the left upper corner of the predetermined region 403 of the selected item. In this aspect, the remaining information 405 is displayed together with the movement direction information 406 on a part based on the outline of the predetermined region 403 of the selected item. The remaining information 405 and the movement direction information 406 may overlap with the predetermined region 403 of the selected item and may be displayed together with the selected item.

In order to distinguish the movement direction information 406 from the remaining information 405, the movement direction information 406 and the remaining information 405 may be displayed as different respective images. For example, the movement direction information 406 may be displayed as a different color image from that of the remaining information 405, or may be displayed as a highlight image. Alternatively, the movement direction information 406 may be displayed as a white or red highlight image, and the remaining information 405 may be displayed as a blue highlight image. However, the characteristics of images which are used for distinguishing the movement direction information 406 from the remaining information 405 are not limited thereto, and respective shapes of displayed lines of the movement direction information 406 and the remaining information 405 may be differently displayed as described above.

The user may know that the position 404' on the display of the device 110 is moved in a direction toward the left upper corner of the predetermined region 403 of the selected item according to the movement information of the remote control apparatus 120 based on the movement direction information 406. Accordingly, the user may predict which item is selectable from among other items which are displayed in proximity to the selected item.

In the pointing information 407, a position 407' on the display of the device 110 which position 407' corresponds to the movement information of the remote control apparatus 120 is disposed inside the predetermined region 403 of the selected item, and a partial region of the position region 402 goes beyond or overlaps with a part of a left outline and a part of an upper outline of the predetermined region 403 of the selected item.

The pointing information 407 includes the movement direction information 409 and remaining information 408 which overlap with a partial region based on an outline of the predetermined region 403 of the selected item. The movement direction information 409 is displayed by overlapping with the part of the left outline and the part of the upper outline of the predetermined region 403 of the selected item. The remaining information 408 is displayed by overlapping with an outline section of the predetermined region 403 other than the part of the left outline and the part of the upper outline of the predetermined region 403 of the selected item. The remaining information 408 and the movement direction information 409 may be displayed such that the remaining information 408 and the movement direction information 409 may be easily distinguished from each other, similarly as the remaining information 405 and the movement direction information 406 that are included in the pointing information 404.

In the pointing information 410, a position 410' on the display of the device 110 which position 410' corresponds to the movement information of the remote control apparatus 120 is disposed inside the predetermined region 403 of the selected item, and a partial region of the position region 402 goes beyond or overlaps with a part of a left outline of the predetermined region 403 of the selected item.

The pointing information 410 includes the movement direction information 412 and remaining information 411 which overlap with an outline of the predetermined region 403 of the selected item information 411. The movement direction information 412 is displayed by overlapping with the part of the left outline of the predetermined region 403 of the selected item. The remaining information 411 is displayed by overlapping with an outline section of the predetermined region 403 other than the part of the left outline of the predetermined region 403 of the selected item. The remaining information 411 and the movement direction information 412 may be displayed such that the remaining information 411 and the movement direction information 412 may be easily distinguished from each other, similarly as the other remaining information 405 and the movement direction information 406 that are included in the pointing information 404.

In the pointing information 413, a position 413' on the display of the device 110 which position 413' corresponds to the movement information of the remote control apparatus 120 is disposed inside the predetermined region 403 of the selected item, and a partial region of the position region 402 goes beyond or overlaps with a part of an outline of a left lower corner of the predetermined region 403 of the selected item.

The pointing information 413 includes the movement direction information 415 and remaining information 414 which overlap with a partial region based on an outline of the predetermined region 403 of the selected item and the movement direction information 415. The movement direction information 415 is displayed by overlapping with the part of the outline of the left lower corner of the predetermined region 403 of the selected item. The remaining information 414 is displayed by overlapping with an outline section of the predetermined region 403 other than the part of the outline of the left lower corner of the predetermined region 403 of the selected item. The remaining information 414 and the movement direction information 415 may be displayed such that the remaining information 414 and the movement direction information 415 may be easily distinguished from each other, similarly as the remaining information 405 and the movement direction information 406 that are included in the pointing information 404.

In the pointing information 416, a position 416' on the display of the device 110 which position 416' corresponds to the movement information of the remote control apparatus 120 is disposed inside the predetermined region 403 of the selected item, and a partial region of the pointing region 402 goes beyond or overlaps with a part of a left outline and a part of a lower outline of the predetermined region 403 of the selected item.

The pointing information 416 includes movement direction information 418 and remaining information 417 which overlap with a partial region based on an outline of the predetermined region 403 of the selected item. The movement direction information 418 is displayed by overlapping with the part of the left outline and the part of the lower outline of the predetermined region 403 of the selected item. The remaining information 417 is displayed by overlapping with an outline section of the predetermined region 403 other than the part of the left outline and the part of the lower outline of the predetermined region 403 of the selected item. The remaining information 417 and the movement direction information 418 may be displayed such that the remaining information 417 and the movement direction information 418 may be easily distinguished from each other, similarly as the remaining information 405 and the movement direction information 406 that are included in the pointing information 404.

In the pointing information 419, a position 419' on the display of the device 110 which position 419' corresponds to the movement information of the remote control apparatus 120 is disposed inside the predetermined region 403 of the selected item, and a partial region of the position region 402 goes beyond or overlaps with a part of a lower outline of the predetermined region 403 of the selected item.

The pointing information 419 includes the movement direction information 421 and remaining information 420 which overlap with a part of an outline of the predetermined region 403 of the selected item. The movement direction information 421 is displayed by overlapping with the part of the lower outline of the predetermined region 403 of the selected item. The remaining information 420 is displayed by overlapping with an outline section of the predetermined region 403 other than the part of the lower outline of the predetermined region 403 of the selected item. The remaining information 420 and the movement direction information 421 may be displayed such that the remaining information 420 and the movement direction information 421 may be easily distinguished from each other, similarly as the remaining information 405 and the movement direction information 406 that are included in the pointing information 404.

In the pointing information 422, a position 422' on the display of the device 110 which position 422' corresponds to the movement information of the remote control apparatus 120 is disposed inside the predetermined region 403 of the selected item, and a partial region of the position region 402 goes beyond or overlaps with a part of a right lower corner outline of the predetermined region 403 of the selected item.

The pointing information 422 includes the movement direction information 424 and remaining information 423 which overlap with an outline of the predetermined region 403 of the selected item. The movement direction information 424 is displayed by overlapping with the part of the right lower corner outline of the predetermined region 403 of the selected item. The remaining information 423 is displayed by overlapping with an outline section of the predetermined region 403 other than the part of the right lower corner outline of the predetermined region 403 of the selected item. The remaining information 423 and the movement direction information 424 may be displayed such that the remaining information 423 and the movement direction information 424 may be easily distinguished from each other, similarly as the remaining information 405 and the movement direction information 406 that are included in the pointing information 404.

In the pointing information 425, a position 425' on the display of the device 110 which position 425' corresponds to the movement information of the remote control apparatus 120 is disposed inside the predetermined region 403 of the selected item, and a partial region of the position region 402 goes beyond or overlaps with a part of a lower outline and a part of a right outline of the predetermined region 403 of the selected item.

The pointing information 425 includes the movement direction information 427 and remaining information 426 which overlap with an outline of the predetermined region 403 of the selected item. The movement direction information 427 is displayed on the part of the lower outline and the part of the right outline of the predetermined region 403 of the selected item. The remaining information 426 is displayed by overlapping with an outline section of the predetermined region 403 other than the part of the lower outline and the part of the right outline of the predetermined region 403 of the selected item. The remaining information 426 and the movement direction information 427 may be displayed such that the remaining information 426 and the movement direction information 427 may be easily distinguished from each other, similarly as the remaining information 405 and the movement direction information 406 that are included in the pointing information 404.

In the pointing information 428, a position 428' on the display of the device 110 which position 428' corresponds to the movement information of the remote control apparatus 120 is disposed inside the predetermined region 403 of the selected item, and a partial region of the position region 402 goes beyond or overlaps with a part of a right outline of the predetermined region 403 of the selected item.

The pointing information 428 includes movement direction information 430 and remaining information 429 which overlap with an outline of the predetermined region 403 of the selected item. The movement direction information 430 is displayed on the part of the right outline of the predetermined region 403 of the selected item. The remaining information 429 is displayed by overlapping with an outline section of the predetermined region 403 other than the part of the right outline of the predetermined region 403 of the selected item. The remaining information 429 and the movement direction information 430 may be displayed such that the remaining information 429 and the movement direction information 430 may be easily distinguished from each other, similarly as the remaining information 405 and the movement direction information 406 that are included in the pointing information 404.

In the pointing information 431, a position 431' on the display of the device 110 which position 421' corresponds to the movement information of the remote control apparatus 120 is disposed inside the predetermined region 403 of the selected item, and a partial region of the position region 402 goes beyond or overlaps with a part of a right upper corner outline of the predetermined region 403 of the selected item.

The pointing information 431 includes the movement direction information 433 and remaining information 429 which overlap with a part of an outline of the predetermined region 403 of the selected item. The movement direction information 433 is displayed on a partial section based on the right upper corner outline of the predetermined region 403 of the selected item. The remaining information 432 is displayed by overlapping with an outline section of the predetermined region 403 other than the partial section of the right upper corner outline of the predetermined region 403 of the selected item. The remaining information 432 and the movement direction information 433 may be displayed such that the remaining information 432 and the movement direction information 433 may be easily distinguished from each other, similarly as the remaining information 405 and the movement direction information 406 that are included in the pointing information 404.

In the pointing information 434, a position 434' on the display of the device 110 which position 434' corresponds to the movement information of the remote control apparatus 120 is disposed inside the predetermined region 403 of the selected item, and a partial region of the position region 402 goes beyond or overlaps with a partial section of an upper outline and a partial section of a right outline of the predetermined region 403 of the selected item.

The pointing information 434 includes the movement direction information 436 and remaining information 435 which overlap with an outline of the predetermined region 403 of the selected item. The movement direction information 436 is displayed on the partial section of the upper outline and the partial section of the right outline of the predetermined region 403 of the selected item. The remaining information 435 is displayed by overlapping with an outline section of the predetermined region 403 other than the partial section of the upper outline and the partial section of the right outline of the predetermined region 403 of the selected item. The remaining information 435 and the movement direction information 436 may be displayed such that the remaining information 435 and the movement direction information 436 may be easily distinguished from each other, similarly as the remaining information 405 and the movement direction information 406 that are included in the pointing information 404.

In the pointing information 437, a position 437' on the display unit of the device 110 which position 437' corresponds to the movement information of the remote control apparatus 120 is disposed inside the predetermined region 403 of the selected item, and a partial region of the position region 402 goes beyond or overlaps with a partial section of an upper outline of the predetermined region 403 of the selected item in the pointing information 437.

The pointing information 437 includes the movement direction information 439 and remaining information 438 which overlap with a part of an outline of the predetermined region 403 of the selected item. The movement direction information 439 is displayed on the partial section of the upper outline of the predetermined region 403 of the selected item. The remaining information 438 is displayed by overlapping with an outline section of the predetermined region 403 other than the partial section of the upper outline of the predetermined region 403 of the selected item. The remaining information 438 and the movement direction information 439 may be displayed such that the remaining information 438 and the movement direction information 439 may be easily distinguished from each other, similarly as the remaining information 405 and the movement direction information 406 that are included in the pointing information 404.

Figure 4C:
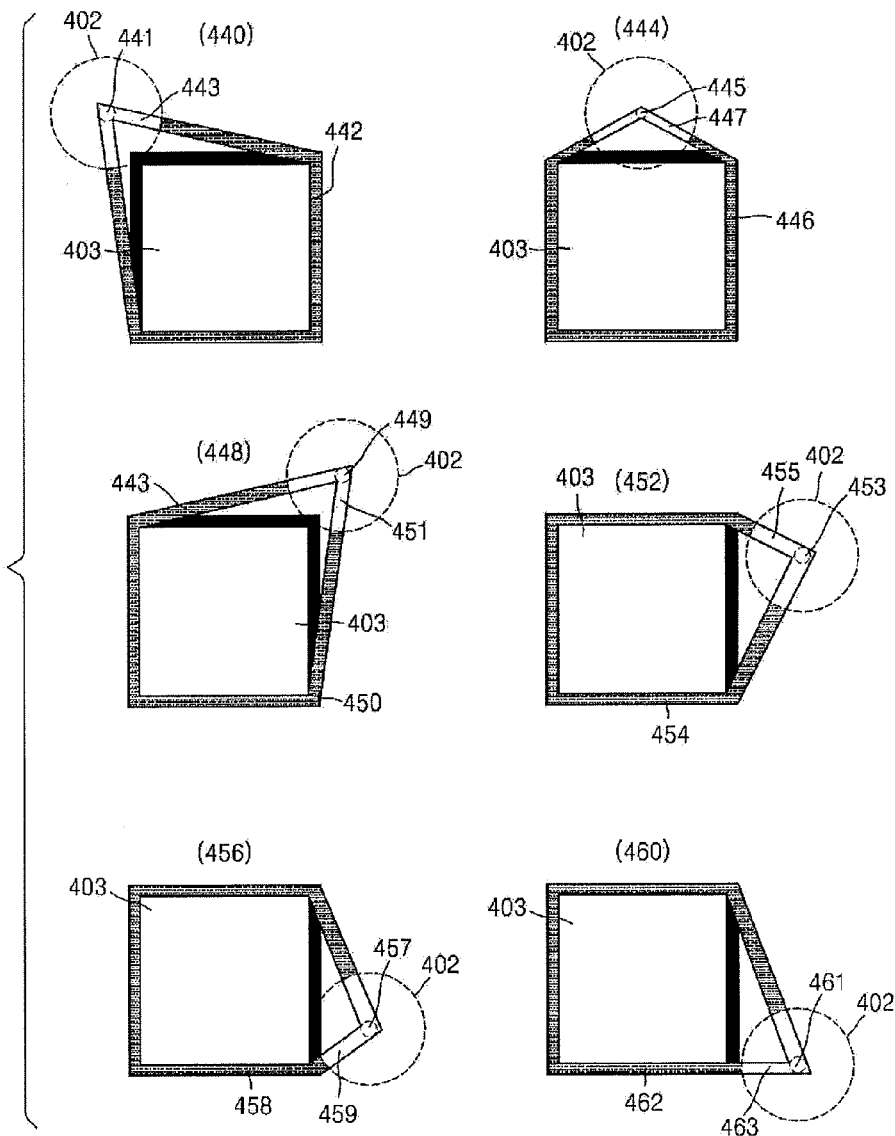
Figure 4D:
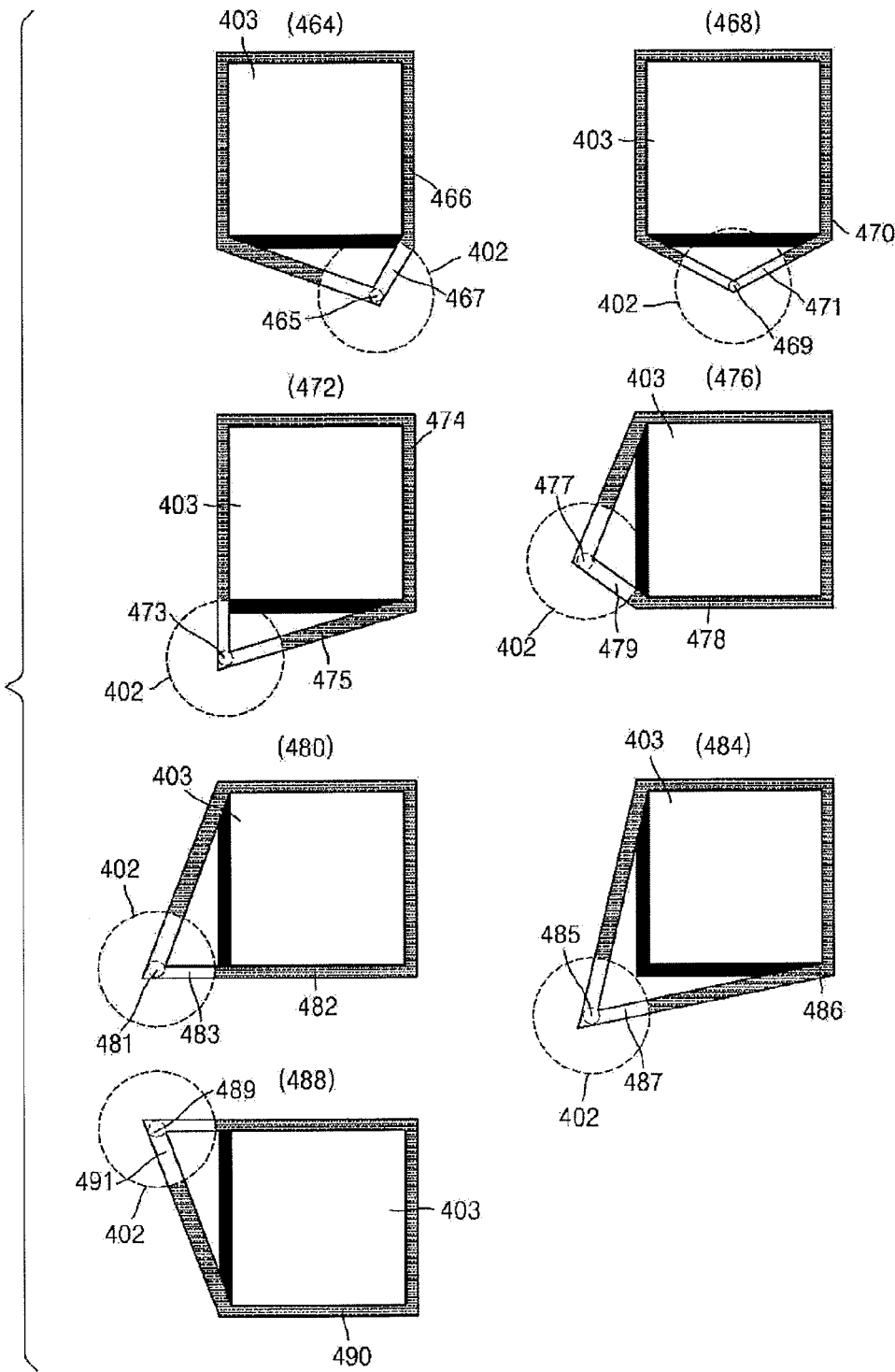

FIGS. 4C and 4D show examples of displaying the pointing information 440, 444, 448, 452, 456, 460, 464, 468, 472, 476, 480, 484, and 488 in which positions 441-445, 449, 453, 457, 461, 465, 469, 473, 477, 481, 485, and 489 on a display of the device 110 which respectively correspond to movement information of the remote control apparatus 120 are disposed outside the predetermined region 403 of a selected item.

Referring to the pointing information 440, the position 441 on the display of the device 110 is disposed outside the predetermined region 403 of the selected item in a direction of and in relative proximity to a left upper corner.

The pointing information 440 includes remaining information 442 that overlaps with a part of an outline of the predetermined region 403 of the selected item and movement direction information 443 that does not overlap with the predetermined region 403 of the selected item. The movement direction information 443 is in a shape which has the position 441 on the display of the device 110 as an apex and is connected to the remaining information 442. The movement direction information 443 may be displayed as an image having a higher brightness level than that of the movement direction information 406, 409, 412, 415, 418, 421, 424, and 427 of FIG. 4A, but a method for displaying the movement direction information 443 is not limited thereto.

A part of the remaining information 442 may not overlap with the outline of the predetermined region 403. The part of the remaining information 442 that does not overlap with the outline of the predetermined region 403 is connected to the movement direction information 443. The part of the remaining information 442 that does not overlap with the outline of the predetermined region 403 may be displayed as the same image as that of the remaining information 442, but is not limited thereto. For example, the part of the remaining information 442 that does not overlap with the outline of the predetermined region 403 may be displayed as a gradation image based on the remaining information 442 or based on the movement direction information 443. A part of the movement direction information 443 may be displayed by overlapping with a part of the predetermined region 403 of the selected item or a part of the outline of the predetermined region 403.

Referring to the pointing information 444, the position 445 on the display of the device 110 is disposed outside the predetermined region 403 of the selected item in a direction of and in relative proximity to an upper outline of the predetermined region 403.

The pointing information 444 includes remaining information 446 that overlaps with an outline of the predetermined region 403 of the selected item and movement direction information 447 that does not overlap with the predetermined region 403 of the selected item. The movement direction information 447 is in a shape which has the position 445 on the display of the device 110 as an apex and is connected to the remaining information 446. A part of the remaining information 446 is connected to the movement direction information 447. The remaining information 446 and the movement direction information 447 may be displayed similarly as the remaining information 442 and the movement direction information 443 that are included in the above-described pointing information 440.

Referring to the pointing information 448, the position 449 on the display of the device 110 is disposed outside the predetermined region 403 of the selected item in a direction of and in relative proximity to a right upper corner of the predetermined region 403.

The pointing information 448 includes remaining information 450 that overlaps with an outline of the predetermined region 403 of the selected item and movement direction information 451 that does not overlap with the predetermined region 403 of the selected item. The movement direction information 451 is in a shape which has the position 449 on the display of the device 110 as an apex and is connected to the remaining information 450. A part of the remaining information 450 is displayed by not overlapping with an outline of the predetermined region 403. A part of the remaining information 450 is connected to the movement direction information 451. The remaining information 450 and the movement direction information 451 may be displayed similarly as the remaining information 442 and the movement direction information 443 that are included in the above-described pointing information 440.

Referring to the pointing information 452, the position 453 on the display of the device 110 is disposed outside the predetermined region 403 of the selected item in a right direction and in relative proximity to a right-side outline of the predetermined region 403.

The pointing information 452 includes remaining information 454 that overlaps with an outline of the predetermined region 403 of the selected item and movement direction information 455 that does not overlap with the predetermined region 403 of the selected item. The movement direction information 455 is in a shape which has the position 453 on the display of the device 110 as an apex and is connected to the remaining information 454. A part of the remaining information 454 is displayed by not overlapping with an outline of the predetermined region 403. A part of the remaining information 454 is connected to the movement direction information 455. The remaining information 454 and the movement direction information 455 may be displayed similarly as the remaining information 442 and the movement direction information 443 that are included in the above-described pointing information 440.

Referring to the pointing information 456, the position 457 on the display of the device 110 is disposed outside the predetermined region 403 of the selected item in another right direction and in relative proximity to a right-side outline of the predetermined region 403.

The pointing information 456 includes remaining information 458 that overlaps with an outline of the predetermined region 403 of the selected item and movement direction information 459 that does not overlap with the predetermined region 403 of the selected item. The movement direction information 459 is in a shape which has the position 457 on the display of the device 110 as an apex and is connected to the remaining information 458. A part of the remaining information 458 is displayed by not overlapping with an outline of the predetermined region 403. A part of the remaining information 458 is connected to the movement direction information 459. The remaining information 458 and the movement direction information 459 may be displayed similarly as the remaining information 442 and the movement direction information 443 that are included in the above-described pointing information 440.

Referring to the pointing information 460, the position 461 on the display of the device 110 is disposed outside the predetermined region 403 of the selected item in a right lower direction and in relative proximity to a lower right corner of the predetermined region 403.

The pointing information 460 includes remaining information 462 that overlaps with an outline of the predetermined region 403 of the selected item and movement direction information 463 that does not overlap with the predetermined region 403 of the selected item. The movement direction information 463 is in a shape which has the position 461 on the display of the device 110 as an apex and is connected to the remaining information 462. A part of the remaining information 462 is displayed by not overlapping with an outline of the predetermined region 403. A part of the remaining information 462 is connected to the movement direction information 463. The information 462 and the movement direction information 463 may be displayed similarly as the remaining information 442 and the movement direction information 443 that are included in the above-described pointing information 440.

Referring to the pointing information 464, the position 465 on the display of the device 110 is disposed outside the predetermined region 403 of the selected item in a lower direction and in relative proximity to a lower-side outline of the predetermined region 403.

The pointing information 464 includes remaining information 466 that overlaps with an outline of the predetermined region 403 of the selected item and movement direction information 467 that does not overlap with the predetermined region 403 of the selected item. The movement direction information 467 is in a shape which has the position 465 on the display of the device 110 as an apex and is connected to the remaining information 466. A part of the remaining information 466 is displayed by not overlapping with an outline of the predetermined region 403. A part of the remaining information 466 is connected to the movement direction information 467. The remaining information 466 and the movement direction information 467 may be displayed similarly as the remaining information 442 and the movement direction information 443 that are included in the above-described pointing information 440.

Referring to the pointing information 468, the position 469 on the display of the device 110 is disposed outside the predetermined region 403 of the selected item in another lower direction and in relative proximity to a lower-side outline of the predetermined region 403.

The pointing information 468 includes remaining information 470 that overlaps with an outline of the predetermined region 403 of the selected item and movement direction information 471 that does not overlap with the predetermined region 403 of the selected item. The movement direction information 471 is in a shape which has the position 469 on the display of the device 110 as an apex and is connected to the remaining information 470. A part of the remaining information 470 is displayed by not overlapping with an outline of the predetermined region 403. A part of the remaining information 470 is connected to the movement direction information 471. The remaining information 470 and the movement direction information 471 may be displayed similarly as the remaining information 442 and the movement direction information 443 that are included in the above-described pointing information 440.

Referring to the pointing information 472, the position 473 on the display of the device 110 is disposed outside the predetermined region 403 of the selected item in a left lower direction and in relative proximity to a lower left corner of the predetermined region 403.

The pointing information 472 includes remaining information 474 that overlaps with an outline of the predetermined region 403 of the selected item and movement direction information 475 that does not overlap with the predetermined region 403 of the selected item. The movement direction information 475 is in a shape which has the position 473 on the display of the device 110 as an apex and is connected to the remaining information 474. A part of the remaining information 474 is displayed by not overlapping with an outline of the predetermined region 403. A part of the remaining information 474 is connected to the movement direction information 475. The remaining information 474 and the movement direction information 475 may be displayed similarly as the remaining information 442 and the movement direction information 443 that are included in the above-described pointing information 440.

Referring to the pointing information 476, the position 477 on the display of the device 110 is disposed outside the predetermined region 403 of the selected item in a left direction and in relative proximity to a left-side outline of the predetermined region 403.

The pointing information 476 includes remaining information 478 that overlaps with an outline of the predetermined region 403 of the selected item and movement direction information 479 that does not overlap with the predetermined region 403 of the selected item. The movement direction information 479 is in a shape which has the position 477 on the display of the device 110 as an apex and is connected to the remaining information 478. A part of the remaining information 478 is displayed by not overlapping with an outline of the predetermined region 403. A part of the remaining information 478 is connected to the movement direction information 479. The remaining information 478 and the movement direction information 479 may be displayed similarly as the remaining information 442 and the movement direction information 443 that are included in the above-described pointing information 440.

Referring to the pointing information 480, the position 481 on the display of the device 110 is disposed outside the predetermined region 403 of the selected item in a left lower direction and in relative proximity to a lower left corner of the predetermined region 403.

The pointing information 480 includes remaining information 482 that overlaps with an outline of the predetermined region 403 of the selected item and movement direction information 483 that does not overlap with the predetermined region 403 of the selected item. The movement direction information 483 is in a shape which has the position 481 on the display of the device 110 as an apex and is connected to the remaining information 482. A part of the remaining information 482 is displayed by not overlapping with an outline of the predetermined region 403. A part of the remaining information 482 is connected to the movement direction information 483. The remaining information 482 and the movement direction information 483 may be displayed similarly as the remaining information 442 and the movement direction information 443 that are included in the above-described pointing information 440.

Referring to the pointing information 484, the position 485 on the display of the device 110 is disposed outside the predetermined region 403 of the selected item in a direction of and in relative proximity to a left lower corner of the predetermined region 403.

The pointing information 484 includes remaining information 486 that overlaps with an outline of the predetermined region 403 of the selected item and movement direction information 487 that does not overlap with the predetermined region 403 of the selected item. The movement direction information 487 is in a shape which has the position 485 on the display of the device 110 as an apex and is connected to the remaining information 486. A part of the remaining information 486 is displayed by not overlapping with an outline of the predetermined region 403. A part of the remaining information 486 is connected to the movement direction information 487. The remaining information 486 and the movement direction information 487 may be displayed similarly as the remaining information 442 and the movement direction information 443 that are included in the above-described pointing information 440.

Referring to the pointing information 488, the position 489 on the display of the device 110 is disposed outside the predetermined region 403 of the selected item in a let upper direction and in relative proximity to an upper left corner of the predetermined region 403.

The pointing information 488 includes remaining information 490 that overlaps with an outline of the predetermined region 403 of the selected item and movement direction information 491 that does not overlap with the predetermined region 403 of the selected item. The movement direction information 491 is in a shape which has the position 489 on the display of the device 110 as an apex and is connected to the remaining information 490. A part of the remaining information 490 is displayed by not overlapping with an outline of the predetermined region 403. A part of the remaining information 490 is connected to the movement direction information 491. The remaining information 490 and the movement direction information 491 may be displayed similarly as the remaining information 442 and the movement direction information 443 that are included in the above-described pointing information 440.

The examples of displaying the pointing information 401, 404, 407, 410, 413, 416, 419, 422, 425, 428, 431, 434, 437, 440, 444, 448, 452, 456, 460, 464, 468, 472, 476, 480, 484, and 488 according to the exemplary embodiments are not limited to those shown in FIGS. 4A, 4B, 4C, and 4D.

As shown in the display examples shown in FIGS. 4A, 4B, 4C, and 4D, the selection information included in the pointing information 401, 404, 407, 410, 413, 416, 419, 422, 425, 428, 431, 434, 437, 440, 444, 448, 452, 456, 460, 464, 468, 472, 476, 480, 484, and 488 may be changed to modified selection information according to an overlapping state between the position region 402 based on a position (401', 404', 407', 410', 413', 416', 419', 422', 425', 428', 431', 434', 437') on the display of the device 110 which corresponds to the movement information of the remote control apparatus 120 and the predetermined region 403 of the selected item, and according to whether the position on the display of the device 110 which corresponds to the movement information of the remote control apparatus 120 is disposed outside the predetermined region 403.

For example, as shown in FIGS. 4A and 4B, the selection information included in the pointing information 401, 404, 407, 410, 413, 416, 419, 422, 425, 428, 431, 434, and 437 may be changed to an image of modified selection information in which a partial image displayed by overlapping with an outline of the predetermined region 403 is changed. As shown in FIGS. 4C and 4D, the selection information included in the pointing information 440, 444, 448, 452, 456, 460, 464, 468, 472, 476, 480, 484, and 488 may be changed to an image of modified selection information in which a corresponding partial image 442, 446, 450, 454, 458, 462, 466, 470, 474, 478, 482, 486, 490 displayed by overlapping with an outline of the predetermined region 403 and the movement direction information 443, 447, 451, 455, 459, 463, 467, 471, 475, 479, 483, 487, and 491 which have a corresponding position 441, 445, 449, 454, 457, 461, 465, 469, 473, 477, 481, 485, 489 on the display beyond the predetermined region 403 as an apex are included.

The pointing information 440, 444, 448, 452, 456, 460, 464, 468, 472, 476, 480, 484, and 488 shown in FIGS. 4C and 4D may be modified such that a symbol which indicates a moving direction of a position on the display is displayed by respectively overlapping with the corresponding position 441, 445, 449, 454, 457, 461, 465, 469, 473, 477, 481, 485, 489 on the display. The symbol may include, for example, any one or more of an arrow, a finger, a graphic character (for example, an avatar), etc., but the symbol is not limited thereto. The symbol may be set or selectively controlled by a user.

Figure 5:
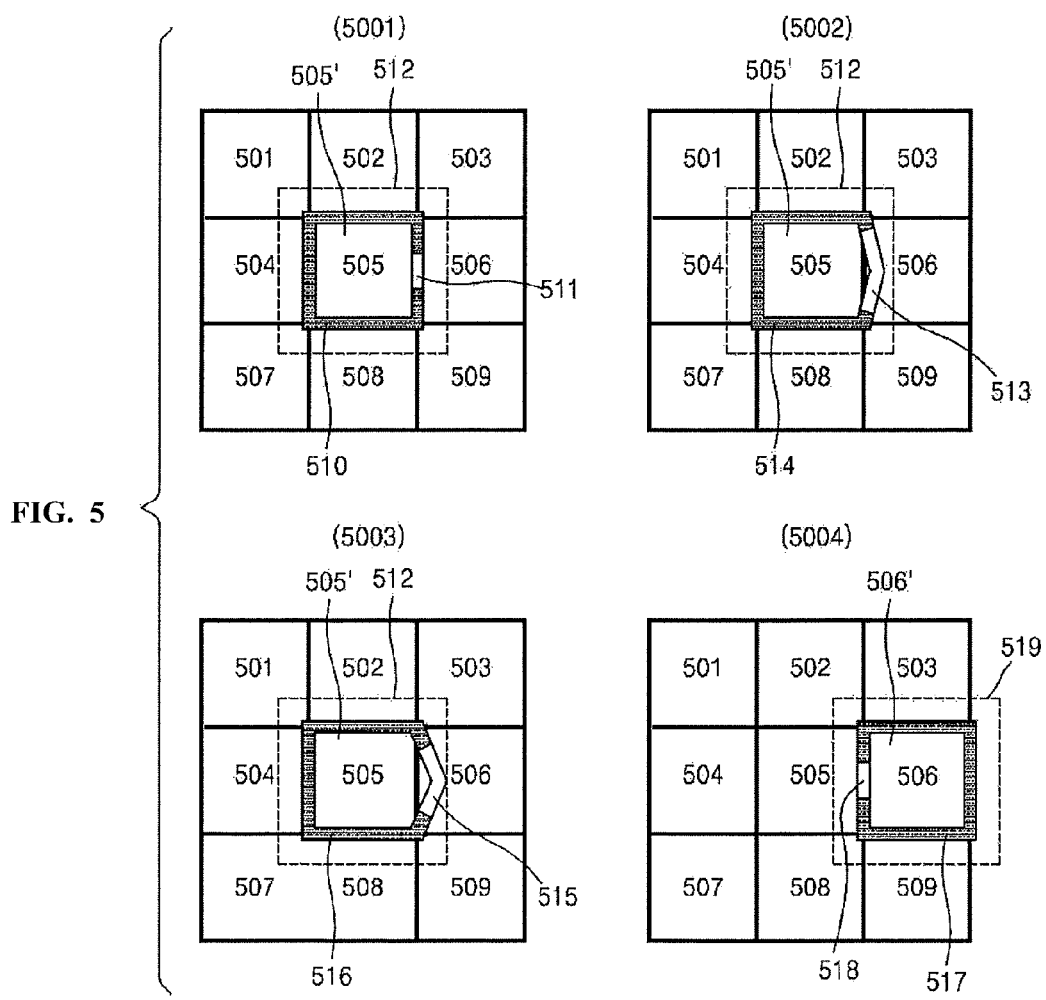
FIG. 5 illustrates examples of displaying pointing information by using a guide region which relates to a selected item, according to exemplary embodiments.

The pointing information 440, 444, 448, 452, 456, 460, 464, 468, 472, 476, 480, 484, and 488 shown in FIGS. 4C and 4D may be displayed by using a guide region which is set in an item unit. FIG. 5 illustrates examples of displaying pointing information by using a guide region 512 which relates to a selected item 505, according to exemplary embodiments. The pointing information illustrated in FIG. 5 includes modified selection information.

Drawing 5001 of FIG. 5 illustrates an example of the pointing information that is displayed by overlapping with an outline of a predetermined region 505' of the item 505 from among a plurality of items 501 through 509. The pointing information shown in drawing 5001 of FIG. 5 includes remaining information 510 and movement direction information 511 that are displayed by overlapping with the outline of the predetermined region 505' of the item 505. A user may predict that another item 506 which is adjacent to the right side of the selected item 505 may be selected based on the pointing information shown in drawing 5001 of FIG. 5.

The guide region 512 may be generated or set according to a preset condition when the item 505 is selected. The guide region 512 may include a partial region which is adjacent to the outside of the predetermined region 505' of the selected item 505. For example, the guide region 512 may be set from the outline of the predetermined region 505' of the selected item 505 to the partial region which is adjacent to the outside of the predetermined region 505'. The partial region may be set, for example, as a pixel number (for example, an m pixel, wherein m is an integer equal to or greater than 1). The guide region 512, which is a region used to determine maintenance of a selection of the selected item 505, is a virtual region.

The guide region 512 may or may not be displayed on a display of the device 110. When the guide region 512 is displayed on the display of the device 110, the guide region 512 may be displayed as a different image from that of the pointing information so that the user may recognize the guide region 512. For example, the guide region 512 may be displayed as a transparent image such that images of the pointing information and the selected item 505 may not be hidden, but an image of the guide region 512 is not limited thereto. When the guide region 512 may be displayed on the display of the device 110, the user may selectively control whether to display the guide region 512.

When the guide region 512 may be displayed on the display of the device 110, the user may adjust a size of the guide region 512. The size of the guide region 512 may be reduced or expanded by using a menu which includes previously determined size information, but the adjustment of the size of the guide region 512 is not limited thereto. For example, the size of the guide region 512 may be reduced or expanded by using a dragging command based on a boundary line of the guide region 512. The dragging command may be input by a user via use of the remote control apparatus 120, but an input of the dragging command is not limited thereto.

A condition which relates to the guide region 512 preset in the device 110 may be set to add the number of m pixels to outline information of the predetermined region 505' of the item 505 as described above. For example, the device 110 may generate the guide region 512 by using left upper coordinate information (x1+m, y1+m) and left lower coordinate information (x2+m, y2+m) that are obtained by adding the number of m pixels to left upper coordinate information (x1, y1) and right lower coordinate information (x2, y2) of the predetermined region 505' of the selected item 505.

The manner of generating of the guide region 512 is not limited to that described above. For example, the guide region 512 may be generated by obtaining 2D coordinate information of four corners of the guide region 512 by using 2D coordinate information of four corners of the predetermined region 505' of the selected item 505. If a selected item is a circular shape or a diamond shape, a guide region of the selected item may be generated by using 2D coordinate information which is obtained by sampling with respect to the outline of the respective predetermined region of the corresponding selected item and condition information of the guide region which is preset in the device 110. For example, the device 110 may generate the guide region of the selected item by using the 2D coordinate information obtained by adding the number of m pixels to the sampled 2D coordinate information. A condition used to generate the guide region 512 preset in the device 110 may be variably set according to a shape of an selected item. For example, when the shape of the selected item is a rectangular shape, the number of pixels in a horizontal line and the number of pixels in a vertical line that are added to the 2D coordinate information may be variably set.

The user may determine, based on the pointing information shown in drawing 5001 of FIG. 5, that a selection state of the selected item 505 is maintained, and that the other item 506 is a selectable item. However, when a position on the display of the device 110 is changed according to movement information of the remote control apparatus 120, one of other items 501 through 504 and 507 through 509 which are adjacent to the selected item 505 may be selectable items due to a change in a display shape of the movement direction information 511.

If the position on the display of the device 110 is moved to the right according to the movement information of the remote control apparatus 120, the pointing information shown in drawing 5001 of FIG. 5 may be changed to pointing information that includes movement direction information 513 which indicates that the position on the display is moved to the item 506 and remaining information 514 connected to the movement direction information 513, as shown in drawing 5002 of FIG. 5. Drawing 5002 of FIG. 5 illustrates an example in which the position on the display of the device 110 is disposed between an outline of the predetermined region 505' of the selected item 505 and an outline of the guide region 512.

If the position on the display of the device 110 is moved farther right than shown in drawing 5002 of FIG. 5 so as to reach the outline of the guide region 512 according to the movement information of the remote control apparatus 120, pointing information as shown in drawing 5003 of FIG. 5 may be displayed. Referring to drawing 5003 of FIG. 5, it can be known that a selection state of the selected item 505 up to the outline of the guide region 512 may be maintained.

At the instant of time when the position on the display of the device 110 is disposed outside the guide region 512 (or goes beyond an outline of the guide region 512) and inside a predetermined region 506' of the other adjacent item 506 according to the movement information of the remote control apparatus 120, pointing information as shown in drawing 5004 of FIG. 5 may be displayed on the display of the device 110. The pointing information of drawing 5004 of FIG. 5 includes remaining information 517 which indicates a selection state of the other item 506 and movement direction information 511 which indicates that the position on the display is moved from the previously selected item 505.

A change from the pointing information of drawing 5003 of FIG. 5 to the pointing information of drawing 5004 of FIG. 5 may be referred to as a magnet effect image, since at the time when the position on the display of the device 110 is disposed outside the guide region 512 according to the movement information of the remote control apparatus 120, the pointing information may be displayed on the display of the device 110 as the pointing information is attached to the predetermined region 506' of the other item 506. The pointing information that is displayed by overlapping with a partial region (for example, the outline) of the predetermined region 506' of the other item 506 may include movement direct information 518 that is displayed by overlapping with a part of a side contacting the predetermined region 505' of the previously selected item 505.

Figure 6:
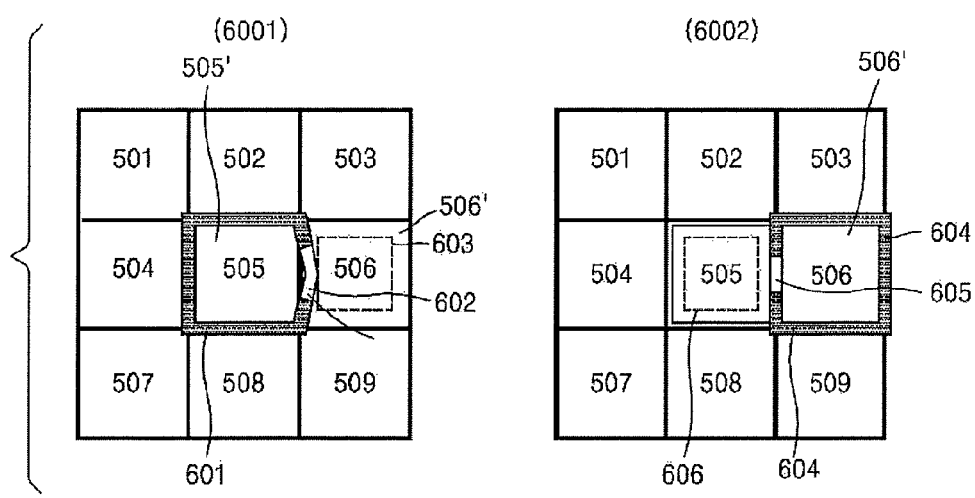
FIG. 6 illustrates examples of displaying pointing information by using guide regions which relate to a selectable item, according to exemplary embodiments.

FIG. 6 illustrates examples of displaying pointing information by using guide regions 603 and 606 which respectively relate to selectable items 505 and 506, according to exemplary embodiments. The pointing information shown in FIG. 6 includes modified selection information as described above according to the exemplary embodiments.

Referring to drawing 6001 of FIG. 6, the pointing information, including remaining information 601 which indicates a selection state of the item 505 and movement direction information 602 which indicates a moving direction in a position on a display so as to select the item 506, is displayed.

The guide region 603 of drawing 6001 of FIG. 6 is generated to include a partial region of the inside of the predetermined region 506' of the selectable item 506. The guide region 603 may be generated or set so as to determine whether to select the items 501 through 504 and 506 through 509 that are not selected. The guide region 603 may be generated or set when the items 501 through 509 are displayed on the display of the device 110.

The guide region 603 may be generated according to condition information preset in the device 110 similarly as the guide region 512 of FIG. 5. The condition information which relates to the guide region 603 may be set to generate or set a partial region based on a center of the predetermined region 506' of the item 506. For example, the guide region 603 may be generated or set at a position moved in a center direction by as much as the number of n pixels (where n is an integer equal to or greater than 1) from an outline of the predetermined region 506' of the item 506. The guide region 603 may be generated or set at a position which is moved in a direction of the outline of the predetermined region 506' of the item 506 by as much as the number of m pixels (where m is an integer equal to or greater than 1) from a center of the item 506. The quantities n and m may be set as the same value.

The guide region 603 is a virtual region, and thus may or may not be displayed on the display of the device 110. When the guide region 603 is displayed on the display of the device 110, the guide region 603 may be displayed as a transparent image so as not to hide an image of the selectable item 506.

If a position on the display of the device 110 is included in the guide region 603 according to movement information of the remote control apparatus 120, as shown in drawing 6002 of FIG. 6, a pointing information which includes remaining information 604 and movement direction information 605 which indicates a selection state of the item 506 are displayed by overlapping with the selected item 506. Accordingly, the guide region 606 for determining whether to select the previously selected item 505 may be generated.

Figure 7:
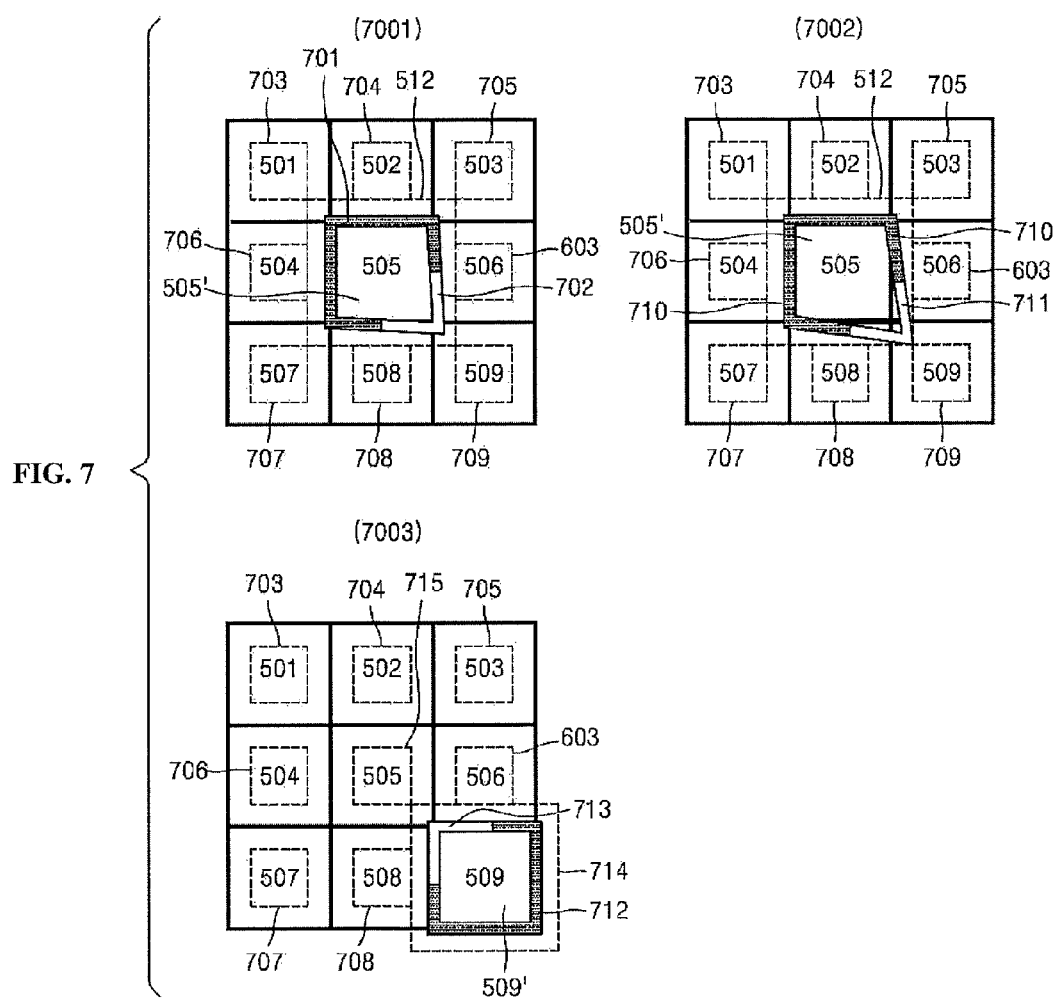
FIG. 7 illustrates examples of displaying pointing information by generating or setting the guide regions of FIG. 5 and the guide regions of FIG. 6.

FIG. 7 illustrates examples of displaying pointing information by generating or setting the guide region 512 of FIG. 5 and the guide region 603 of drawing 6001 of FIG. 6 together. The pointing information of FIG. 7 includes modified selection information.

Referring to drawing 7001 of FIG. 7, the device 110 may display the pointing information which includes remaining information 701 and movement direction information 702 while determining a selection maintenance status with respect to the selected item 505 based on the guide region 512, and may determine whether to select the items 501 through 504 and 506 through 509 that may be selectable by using the guide regions 603 and 703 through 709. The remaining information 701 is displayed by overlapping with a partial region based on an outline of the predetermined region 505' of the selected item 505. A part of the remaining information 701 may be displayed by not overlapping with the partial region based on the outline of the predetermined region 505' of the selected item 505. A part of the movement direction information 702 may be displayed by overlapping with the partial region based on the outline of the predetermined region 505' of the selected item 505, and another part of the remaining information 701 may be displayed by not overlapping with the partial region based on the outline of the predetermined region 505' of the selected item 505. Overlapping of a part of the movement direction information 702 with the partial region based on the outline of the predetermined region 505' of the selected item 505 and not overlapping of a part of the remaining information 701 with the partial region based on the outline of the predetermined region 505' of the selected item 505 may be determined according to an overlapping status between a position region generated based on a position on a display and the predetermined region 505'.

When the position on the display of the device 110 is disposed at a corner of the guide region 512 for selecting the other item 509 according to movement information which relates to the remote control apparatus 120, the pointing information of drawing 7001 of FIG. 7 is changed to the pointing information shown in drawing 7002 of FIG. 7.

The pointing information of drawing 7002 of FIG. 7 includes remaining information 710 and movement direction information 711. A part of the remaining information 710 may be displayed by overlapping with a partial region based on an outline of the predetermined region 505' of the selected item 505, and another part of the remaining information 710 may be displayed by not overlapping with the partial region based on the outline of the predetermined region 505' of the selected item 505. The movement direction information 711 is displayed by approaching a position on a display for selecting the item 509 closer to the item 509 than the movement direction information 702 illustrated in drawing 7001 of FIG. 7 while reducing a section of overlapping with the partial region based on the outline of the predetermined region 505' of the selected item 505 as compared to the movement direction information 702 illustrated in drawing 7001 of FIG. 7.

At the moment when the position on the display of the device 110 is disposed outside the guide region 512 of the item 505 and is disposed inside the guide region 709 of the other item 509 according to movement information of the remote control apparatus 120, the pointing information of drawing 7002 of FIG. 7 may be changed to the pointing information of drawing 7003 of FIG. 7.

The pointing information of drawing 7003 of FIG. 7 includes remaining information 712 and movement direction information 713. The remaining information 712 is displayed by overlapping with a partial region based on an outline of the other item 509. The movement direction information 713 is displayed by overlapping with the partial region based on the outline of the other item 509 adjacent to the predetermined region 505' of the previously selected item 505. Since the other item 509 is selected, the guide region 709 of the item 509 is changed to the guide region 714 for determining whether to maintain a selection of the selected item 509. The guide region 512 of the item 505 is changed to the guide region 715 for determining whether to select the item 505.

Figure 8:
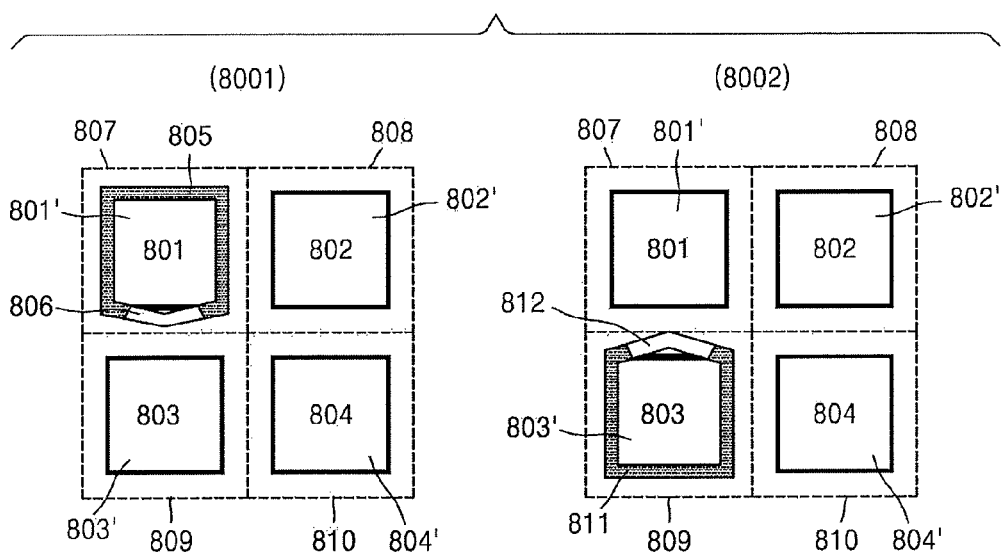
FIG. 8 illustrates examples in which guide regions for determining whether to maintain a selection and a selection status include partial regions outside predetermined regions of items.

FIG. 8 illustrates cases in which guide regions 807, 808, 809, and 810 for determining whether to maintain a selection and a selection status with respect to all items 801, 802, 803, and 804 include partial regions outside respective predetermined regions 801', 802', 803', and 804' of the items 801 802, 803, and 804. This may be applied to a case in which boundary surfaces of a plurality of items 801, 802, 803, and 804 are spaced away from each other. Pointing information of drawings 8001 and 8002 of FIG. 8 includes modified selection information.

Referring to drawing 8001 of FIG. 8, the pointing information including remaining information 805 and movement direction information 806 that overlap with a partial region based on an outline of the predetermined region 801' of the item 801 is displayed on the display of the device 110. A part of the movement direction information 806 may not overlap with the partial region based on the outline of the predetermined region 801'. The guide region 807 of the item 801 may be used to determine whether to maintain a selection of the item 801. The respective guide regions 808, 809, and 810 of the items 802, 803, and 804 may be used to determine whether to select the items 802, 803, and 804. At the moment when a position on a display of the device 110 is disposed outside the guide region 807 and is disposed inside the other guide region 809 according to movement information of the remote control apparatus 120, the pointing information of drawing 8001 of FIG. 8 may be changed to pointing information which includes remaining information 811 and movement direction information 812 which indicates a selection of the other item 803, as shown in drawing 8002 of FIG. 8.

The pointing information of drawing 8002 of FIG. 8 includes the movement direction information 812 and the remaining information 811 that overlap with a partial region based on an outline of the predetermined region 803' of the selected item 803. A part of the movement direction information 812 may not overlap with the partial region based on the outline of the predetermined region 803' of the selected item 803. The movement direction information 812 points toward the predetermined region 801' of the previously selected item 801, as shown in drawing 8002 of FIG. 8, according to the movement direction of the remote control apparatus 120. The movement direction information 812 may be considered that the above-described magnet effect image is applied. In case of the pointing information of drawing 8002 of FIG. 8, there is a possibility that the previously selected item 801 may be selectable rather than the other items 802 and 804.

Referring to FIG. 1, the movement information received from the remote control apparatus 120 is based on a movement of the remote control apparatus 120. The movement of the remote control apparatus 120 may be obtained by using a movement sensor 121 included in the remote control apparatus 120. Thus, the movement information may include a sensor value which is output by the movement sensor 121, 2D coordinate information (x, y) which corresponds to the sensor value which is output by the movement sensor 121, and/or movement change information (dx, dy) which is based on the sensor value which is output by the movement sensor 121.

The movement sensor 121 may use a 6 axis acceleration sensor (±x, ±y, ±z), a 3 axis acceleration sensor (x, y, z), etc., but the movement sensor 121 is not limited thereto. When the movement sensor 121 uses the 6 axis acceleration sensor, the movement sensor 121 outputs 6 sensor values (+x axis sensor value, −x axis sensor value, +y axis sensor value, −y axis sensor value, +z axis sensor value, and −z axis sensor value). The 6 sensor values may include voltage values, but a format of the sensor values is not limited thereto.

The movement information transmitted from the remote control apparatus 120 to the device 110 may include 6 sensor values. When the movement information includes the 6 sensor values, the device 110 converts the 6 sensor values included in the received movement information into 2D coordinate information (or image coordinate information), obtains the movement change information (dx, dy) by using the converted 2D coordinate information, and obtains information (dx', dy') which relates to the position on the display by using the movement change information (dx, dy) and reference coordinate information (x', y') on the display set in the device 110. The process of obtaining the information (dx', dy') which relates to the position on the display in correspondence with to the movement information of the remote control apparatus 120 may be performed, since a coordinate system that may be expressed according to a movement of the remote control apparatus 120 and a coordinate system on the display of the device 110 are different, or a reference coordinate set in the remote control apparatus 120 and a reference coordinate on the display of the device 110 are different. When the coordinate system that may be expressed according to the movement of the remote control apparatus 120 and the coordinate system on the display of the device 110 are the same, and the reference coordinate set in the remote control apparatus 120 and the reference coordinate on the display of the device 110 are the same, a process of obtaining the information which relates to the position on the display in correspondence with to the movement information of the remote control apparatus 120 may not be performed.

The movement information may include a value obtained by converting the 6 sensor values into the 2D coordinate information. In particular, the remote control apparatus 120 may convert the 6 sensor values into the 2D coordinate information and transmit the 2D coordinate information to the device 110 as the movement information. The 6 sensor values may be converted into the 2D coordinate information by using a method of converting 3D coordinate information into the 2D coordinate information, but the conversion of the 6 sensor values into the 2D coordinate information is not limited thereto.

The device 110 may obtain the movement change information (dx, dy) which relates to the remote control apparatus 120 by using the 2D coordinate information included in the received movement information, and may obtain the information (dx', dy') which relates to the position on the display by using the movement change information (dx, dy) and the reference coordinate information (x', y') on the display set in the device 110. When the information (dx', dy') which relates to the position on the display is obtained, the information (dx', dy') which relates to the position on the display may be corrected according to a size of the display (for example, a diagonal length of the display) of the device 110. For example, if the information (dx', dy') which relates to the position on the display goes beyond a threshold value set based on the size of the display of the device 110, the information (dx', dy') which relates to the position on the display may be corrected by using the threshold value and information which relates to a preset correction range. The information which relates to the correction range may be determined according to movement information that may be input and information which relates to the size of the display of the device 110, but a determination of information which relates to the correction range is not limited thereto.

The movement information of the remote control apparatus 120 may include the movement change information (dx, dy) which relates to the remote control apparatus 120. In particular, the remote control apparatus 120 converts the 6 sensor values into the 2D coordinate information, and obtains the movement change information (dx, dy) which relates to the remote control apparatus 120 by using the 2D coordinate information and initial values (x0, y0). For example, if the 2D coordinate information which corresponds to the 6 sensor values is (x3, y3), the movement change information (dx, dy) which relates to the remote control apparatus 120 is obtained as (x3-x0, y3-y0).

If the movement change information (dx, dy) which relates to the remote control apparatus 120 is included in the received movement information, the device 110 may obtain the information (dx', dy') which relates to the position on the display by using the reference coordinate information (x', y') on the display set in the device 110 as described above.

The reference coordinate information (x', y') on the display set in the device 110 may be position information set as default in the device 110. For example, the reference coordinate information (x', y') on the display may include one of a leftmost upper point on the display, a center on the display, a rightmost upper point on the display, a leftmost lower point on the display, and a rightmost lower point on the display, but a position of the reference coordinate information (x', y') on the display is not limited thereto. The reference coordinate information (x', y') on the display set in the device 110 may include position information on the display of the device 110 before or when receiving the movement information. The reference coordinate information (x', y') on the display set in the device 110 may or may not be displayed on the display. A position on the display which is determined according to the received movement information may or may not be displayed on the display unit.

The remote control apparatus 120 may control a function of the device 110 via wireless communication and detect a movement of the remote control apparatus 120 by using the movement sensor 121. The remote control apparatus 120 may include, for example, any one or more of a remote controller for the device 110, a remote controller for controlling the device 110 and a settop box connected to the device 110, a mobile terminal which includes a control application relating to the device 110, a wireless keyboard or a wearable device capable of wireless communication, and an integrated type remote controller capable of controlling a plurality of devices, but the remote control apparatus 120 is not limited thereto. The remote control apparatus 120 may be referred to as an external device of the device 110.

If the remote control apparatus 120 starts an operation of displaying pointing information (or a pointing user interface) according to a user input, the remote control apparatus 120 may configure the movement information by using the sensor value which is output by the movement sensor 121, and then may transmit the movement information to the device 110. For example, when the remote control apparatus 120 includes a touch panel which is capable of receiving a touch input, after a pointing information display start command is received based on the touch input via the touch panel, if the remote control apparatus 120 moves, the remote control apparatus 120 may configure the movement information by using the sensor value which is output by the movement sensor 121 and transmit the movement information to the device 110.

The above-described pointing information shown in FIGS. 3A through 8 is displayed by overlapping with a part based on an outline of a predetermined region of a selected item. However, a part of the selected item overlapping with the point information is not limited to the part based on the outline of the predetermined region of the selected item. The pointing information according to an exemplary embodiment may be displayed by overlapping with the part of the predetermined region of the selected item or the part of the selected item. For example, the pointing information may be displayed by overlapping with a center of the predetermined region of the selected item or a part based on a center of the selected item.

Figure 9:
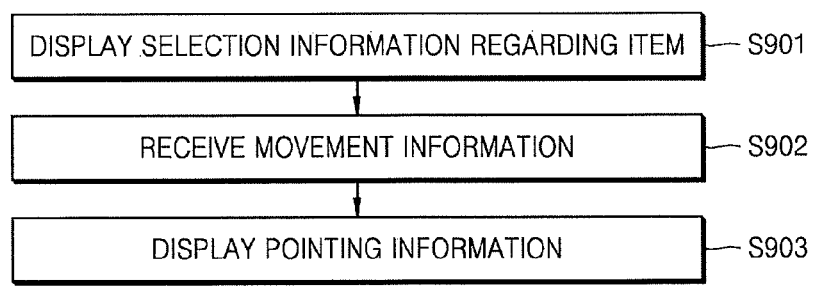
FIG. 9 is a flowchart of a method for displaying pointing information, according to an exemplary embodiment.

FIG. 9 is a flowchart of a method for displaying pointing information, according to an exemplary embodiment.

In operation S901, the device 110 displays a plurality of items on a display, and displays by overlapping selection information which indicates that one of the plurality of items has been selected with at least a part of the selected item. The plurality of items may be arranged as described with reference to any one or more of FIGS. 2A through 2F, but the possible types of arrangements are not limited thereto.

The selection information may be displayed according to a position on the display which corresponds to movement information received from the remote control apparatus 120. The device 110 may obtain information which relates to the position on the display of the device 110 by using information included in the received movement information and information which relates to a reference coordinate on the display of the device 110 as described with reference to FIG. 1. The device 110 may display the selection information based on the information which relates to the position on the display. For example, the device 110 may display the selection information similarly as the selection information 403' which is included in the pointing information 401 of FIG. 4A.

The device 110 may determine whether the position on the display is disposed inside or outside predetermined regions of the plurality of items by using the information which relates to the position on the display in correspondence with the received movement information and layout information which relates to the displayed plurality of items. The layout information may be stored in the device 110. The layout information may include, for example, names of the plurality of items and 2D coordinate information of the predetermined regions of the plurality of items.

FIG. 10 is a table of layout information which relates to a plurality of items stored in the device 110. Referring to FIG. 10, the layout information which relates to the items includes names (A, B, and C) of the items, left upper coordinate information with respect to the items, and right lower coordinate information with respect to the items. Indices i and j of FIG. 10 include an integer equal to or greater than zero. The left upper coordinate information with respect to the item A is $(x_i, y_j)$, and the right lower coordinate information thereof is $(x_{i+4}, y_{j+4})$. The left upper coordinate information with respect to the item B is $(x_i, y_{j+5})$, and the right lower coordinate information thereof is $(x_{i+4}, y_{j+9})$. The left upper coordinate information with respect to the item C is $(x_{i+4}, y_{i+9})$, and the right lower coordinate information thereof is $(x_{i+8}, y_{j+13})$. The layout information with respect to the items is not limited to the above-described information.

For example, the layout information with respect to the items may include coordinate information which relates to the names of the items and four corners of a predetermined region of the items and/or coordinate information which relates to a plurality of sampling points of the predetermined region of the items. The plurality of sampling points may be set according to shapes of the items. For example, the plurality of sampling points of circular shape items and diamond shape items may be different. The device 110 may determine a position of the predetermined region of the plurality of items (or positions of the plurality of items) that are displayed on the display based on the layout information with respect to the items.

When the items displayed on the display of the device 110 are arranged in a horizontal direction, the device 110 may change the position on the display of the device 110 in consideration of x axis coordinate information included in the received movement information without considering y axis coordinate information included therein.

When the items displayed on the display of the device 110 are arranged in a vertical direction, the device 110 may change the position on the display of the device 110 in consideration of the y axis coordinate information included in the received movement information without considering the x axis coordinate information included therein.

When the items displayed on the display of the device 110 are arranged in a diagonal direction or at random, the device 110 may change the position on the display of the device 110 in consideration of both the x axis coordinate information and the y axis coordinate information included in the received movement information.

If no item is present in the changed position on the display, the device 110 may correct the position on the display by using the layout information with respect to the items so as to indicate a selection of an item displayed on a position most adjacent to the changed position on the display.

In operation S902, the device 110 receives the movement information which relates to the remote control apparatus 120 from the remote control apparatus 120 used to select the plurality of items.

In operation S903, the device 110 obtains the position on the display which corresponds to the received movement information, and displays the pointing information on the display according to whether the obtained position on the display is disposed outside or inside the predetermined region including a selected item.

In particular, if the position on the display and a position region based on the position on the display are disposed inside the predetermined region which includes the selected item, the device 110 may display the pointing information which includes the selection information overlapping with a part of the predetermined region on the display, similarly as the pointing information 401 of FIG. 4A.

If the position on the display is disposed inside the predetermined region which includes the selected item and a part of the position region based on the position on the display is disposed outside the predetermined region, the device 110 may display the pointing information which includes modified selection information, similarly as the modified selection information 404, 407, 410, 413, 416, 419, 422, 425, 428, 431, 434, and 439 of FIGS. 4A and 4B, on the display.

If the position on the display and a part or the whole of the position region based on the position on the display are disposed outside the predetermined region which includes the selected item, the device 110 may display the pointing information which includes modified selection information, similarly as the modified selection information 440, 444, 448, 452, 456, 460, 464, 472, 476, 480, 484, and 488 of FIGS. 4C and 4D, on the display unit.

In operation S903 of FIG. 9, the device 110 may display the pointing information by using the guide region.

Figure 11:
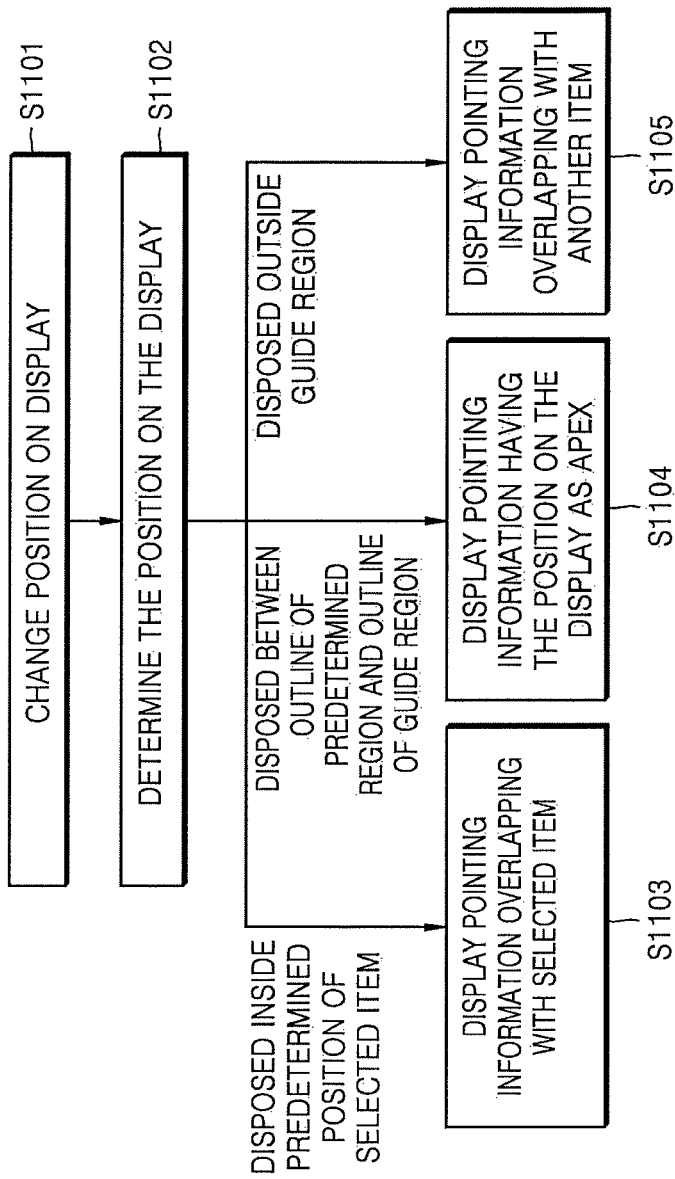
FIG. 11 is a flowchart of a process performed in an operation of displaying pointing information of FIG. 9, according to an exemplary embodiment.

FIG. 11 is a flowchart of a process performed in operation S903 of FIG. 9. Pointing information which relates to a selected item is displayed by using the guide regions 512 and 519 for determining whether to maintain a selection of the selected item as shown in drawings 5001, 5002, 5003, and 5004 of FIG. 5.

In operation S1101 of FIG. 11, the device 110 changes a position on a display. The position on the display may be changed as described with reference to FIG. 9 above.

In operation S1102, the device 110 determines the changed position on the display by using a predetermined region of the plurality of items 501 through 509 and information which relates to a guide region of the selected item. The changed position on the display may be determined as described above with reference to FIGS. 4A, 4B, and 5. The changed position on the display is based on a movement of a position on a display which corresponds to a movement information of the remote control apparatus 120.

As a result of the determination in operation S1102, when the position on the display is disposed inside the predetermined region 505', in operation S1103, the device 110 displays pointing information by overlapping a part of the predetermined region 505' of the item 505 with the remaining information 511 and the movement direction information 512, as shown in drawing 5001 of FIG. 5. Accordingly, a user may determine that the item 505 is in a selection status, and the movement direction information 512 which indicates a moving direction of the changed position on the display points toward the item 506.

As a result of the determination in operation S1102, when the position on the display is disposed between an outline of the predetermined region 505' of the item 505 and an outline of the guide region 512, in operation S1104, the device 110 displays pointing information which includes the movement direction information 513 which has the position on the display as an apex and is connected to the remaining information 514, as shown in drawing 5002 of FIG. 5. Accordingly, a user may predict that the item 505 is in a selection status, but the other item 506 can be selected.

As a result of the determination in operation S1102, when the position on the display is disposed outside the guide region 512 of the item 505, in operation S1105, the device 110 displays pointing information by overlapping the predetermined region 506' of the new item 506 with the remaining information 517 and the movement direction information 518. Accordingly, the user may determine that the item 506 is in a selection status, and the position on the display approaches the item 505. The pointing information of drawings 5001, 5002, 5003, and 5004 of FIG. 5 is continuously displayed on the display of the device 110, and thus the user may determine that after the item 506 is selected, a previously selected item is the item 505, and a selectable item is the item 505.

As described above, the method for displaying the pointing information according to an exemplary embodiment may include converting a sensing value based on a movement of the remote control apparatus 120 received in real time into information which relates to a position on a display and then displaying pointing information which is changed in real time by using the information which relates to the position on the display, but the method for displaying the pointing information is not limited thereto.

For example, the device 110 may read pointing information which has been previously stored in a memory included in the device 110 and display the pointing information on the display according to the information which relates to the position on the display. The pointing information previously stored in the memory included in the device 110 may be configured as an image in which movement direction information is preset in a particular direction. For example, the pointing information previously stored in the memory may be configured as an image which includes movement direction information which indicates a horizontal direction (or an east direction or a west direction with respect to an item), a vertical direction (or a north direction or a south direction with respect to the item), and/or a diagonal direction (or a northeast direction, a southeast direction, or a northwest direction with respect to the item). Thus, the device 110 may display by overlapping the pointing information including the movement direction information which indicates the horizontal direction, the vertical direction, and/or the diagonal direction according to the position on the display which corresponds to the received movement information with the item.

Figure 12:
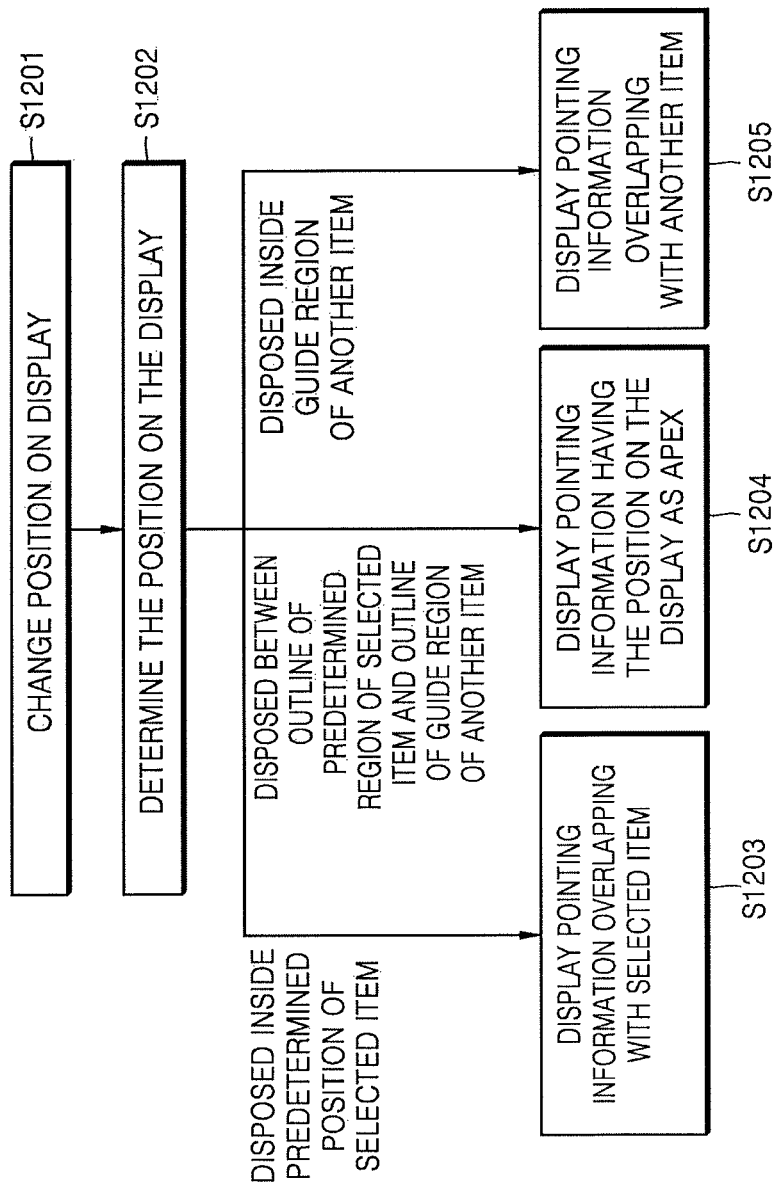
FIG. 12 is a flowchart of a process performed in an operation of displaying pointing information of FIG. 9, according to another exemplary embodiment.

FIG. 12 is a flowchart of a process performed in operation S903 of FIG. 9. The device 110 displays pointing information by using the guide regions 603 and 606 for determining whether to maintain a selection of an item, as shown in drawings 6001 and 6002 of FIG. 6.

In operation S1201 of FIG. 12, the device 110 changes a position on a display according to received movement information. The position on the display may be changed as described above with reference to FIG. 9.

In operation S1202, the device 110 determines the changed position on the display by using a predetermined region of the plurality of items 501 through 509 and information which relates to a guide region of another item. The changed position on the display may be determined as described above with reference to FIGS. 4A, 4B, 5, and 9. In operation S1202, the device 110 may consider a previous position on the display so as to accurately determine a moving direction of the changed position on the display.

As a result of the determination in operation S1202, when the position on the display is not disposed between an outline of the predetermined region 505' of the item 505 and an outline of the guide region 603 and is disposed inside the predetermined region 505' of the item 505, in operation S1203, the device 110 may display pointing information by overlapping the predetermined region 505' of the item 505 with the remaining information 511 and the movement direction information 512, as shown in drawing 5001 of FIG. 5. The pointing information displayed by overlapping with the predetermined region 505' of the item 505 is not limited to the pointing information shown in drawing 5001 of FIG. 5.

As a result of the determination in operation S1202, when the position on the display is disposed between the outline of the predetermined region 505' of the item 505 and the outline of the guide region 603 of the other item 506 (or an adjacent item), in operation S1204, the device 110 may display pointing information which includes the movement direction information 602 which has the position on the display as an apex and is connected to the remaining information 601, as shown in drawing 6001 of FIG. 6.

As a result of the determination in operation S1202, when the position on the display is disposed inside the guide region 603 of the other item 506, in operation S1205, the device 110 may display pointing information by overlapping a part of the predetermined region 506' of the other item 506 with the remaining information 604 and the movement direction information 605. The pointing information displayed by overlapping with the part of the predetermined region 506' of the other item 506 is not limited to the pointing information shown in drawing 6002 of FIG. 6.

Figure 13:
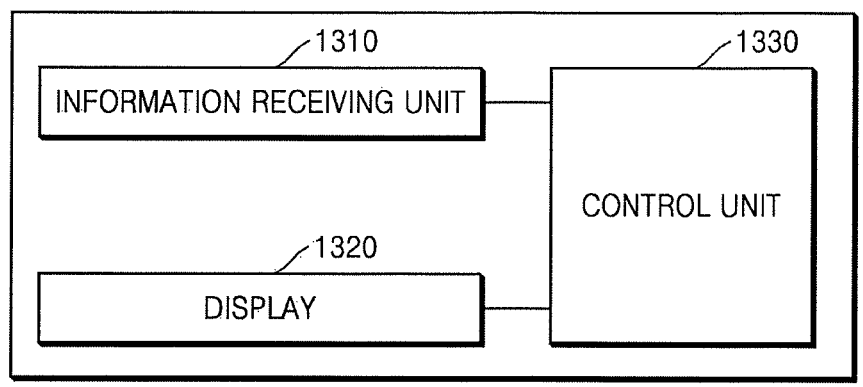
FIGS. 13 and 14 are block diagrams of a device, according to exemplary embodiments.

FIG. 13 is a block diagram of the device 110, according to an exemplary embodiment. Referring to FIG. 13, the device 110 may include an information receiving unit (also referred to herein as an "information receiver") 1310, a display 1320, and a control unit (also referred to herein as a "controller") 1330. The device 110 may be implemented to include more or less constituent elements than those shown in FIG. 13.

Figure 14:
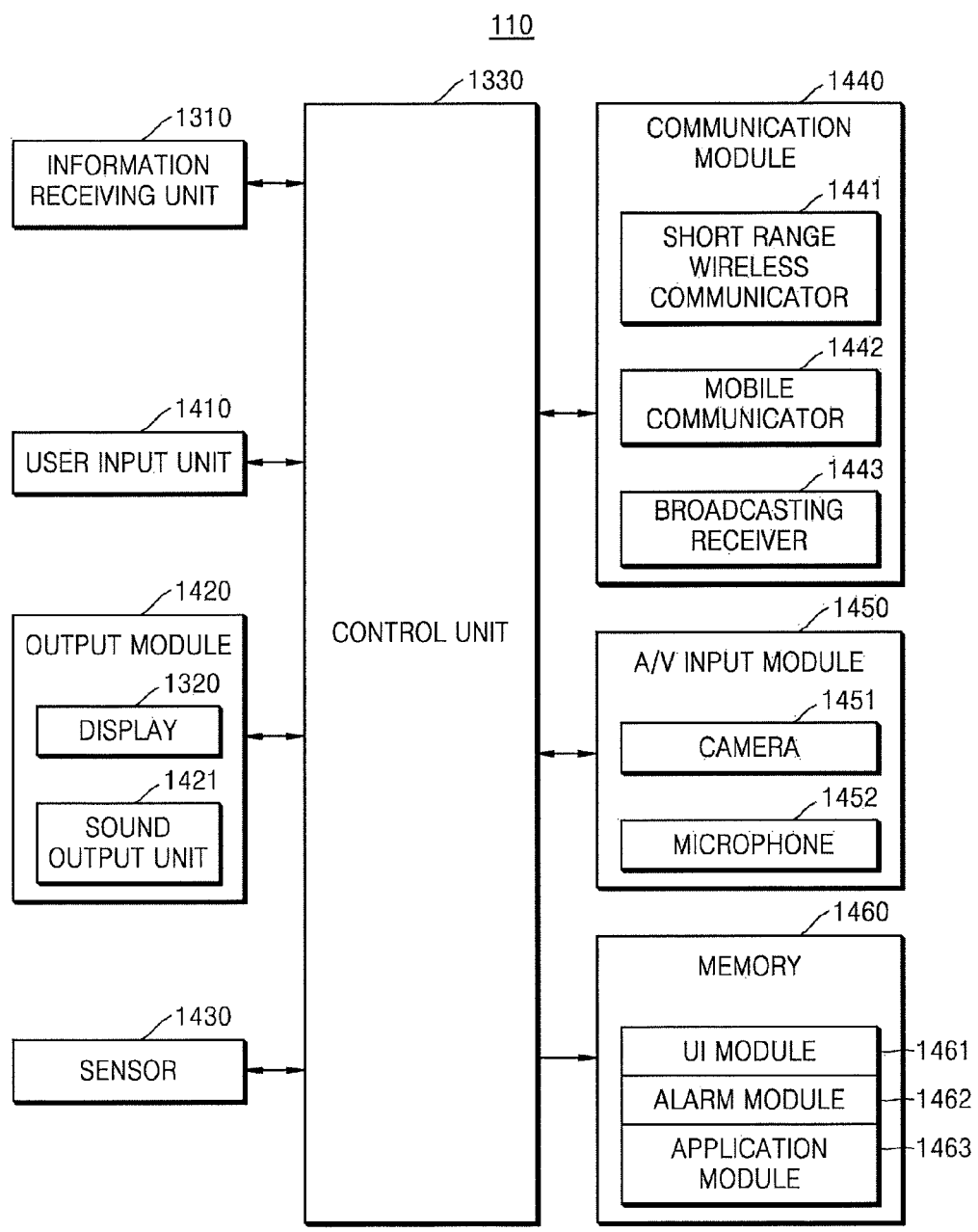

For example, as shown in FIG. 14, the device 110 according to an exemplary embodiment may further include a user input unit (also referred to herein as a "user input device") 1410, an output module 1420 which includes the display 1320 and a sound output unit (also referred to herein as a "sound output device") 1421, a sensor 1430, a communication module (also referred to herein as a "communication device" and/or as a "communication apparatus") 1440, an audio/video (A/V) input module (also referred to herein as an "A/V input device" and/or as an "A/V input apparatus") 1450, and a memory 1460.

The information receiving unit 1310 of FIG. 14 may be configured to receive movement information from the remote control apparatus 120 of FIG. 1. The information receiving unit 1310 may be configured according to an information transmission unit (also referred to herein as an "information transmitter") (not shown) of the remote control apparatus 120. The information receiving unit 1310 may be configured to receive the movement information from the remote control apparatus 120 via one of wireless communication methods as mentioned with reference to FIG. 1 above. The information receiving unit 1310 may receive control information for controlling a function of the device 110 in addition to the above-described movement information.

The user input unit 1410 may be installed in the device 110 and used to receive an input of data from a user in order to control the device 1100. For example, the user input unit 1410 may include at least one of a key pad, a dome switch, a touch pad (based on any one or more of a contact type electrostatic capacitive method, a pressure resistive layer method, an infrared ray sensing method, a surface ultrasonic wave conduction method, an integration type tension measurement method, a piezoelectric effect method, and/or the like), a jog wheel, and a jog switch, but the user input unit 1410 is not limited thereto.

The output module 1420 may output an audio signal and/or a video signal, but the output module 1420 is not limited thereto. The output module 1420 may include the display 1320 and the sound output unit 1421, but a component included in the output module 1420 is not limited thereto.

The display 1320 may be configured to display information processed by the device 110. The display 1320 may display pointing information overlapping with a plurality of items as shown in FIGS. 3A through 3G and described above.

When the display 1320 and the touch pad have a layer structure and are configured as a touch screen, the display 1320 may be used as an input and output unit, as well as an output unit. The display 1320 may include at least one of a liquid crystal display (LCD), a thin film transistor-liquid crystal display (TFT-LCD), an organic light-emitting diode (OLED), a flexible display, a three-dimensional (3D) display, and an electrophoretic display (EPD). The device 110 may include two or more displays 1320 according to an implementation type of the device 110. In this regard, the two or more displays may be disposed to face each other by using a hinge.

The sound output unit 1421 outputs audio data which is received from the communication module 1440 or stored in the memory 1460. The sound output unit 1421 may output a sound signal relating to a function (for example, a notification sound) performed by the device 110. The sound output unit 1421 may include any one or more of a speaker, a buzzer, etc.

The sensor 1430 may be configured to include at least one of a sensor for detecting whether a user approaches the device 110, a sensor for detecting illumination in proximity to the device 110, a sensor for recognizing a user's voice of the device 110, and a sensor for detecting a mood and activity of the user of the device 110, and to transmit a detection result to the control unit 1330.

The sensor 1430 may be configured to detect a mood and/or an activity of the user by using an external device connected to the sensor 1430, and to transmit the detection result to the control unit 1330. According to the detection result of the sensor 1430, the control unit 1330 may determine a plurality of items displayed on the display 1320. For example, if the user of the device 110 is detected as being depressed, the control unit 1330 may display the plurality of items based on content that may refresh the user on the display 1320. The external device may include a measurement machine for monitoring the mood and/or activity of the user.

The sensor 1430 may detect a state of the device 110 and/or a peripheral environment of the device 110, and transmit detection information to the control unit 1330.

The sensor 1430 may include at least one of a temperature/humidity sensor, an infrared sensor, a position sensor (for example, a global position system (GPS) receiver), an atmosphere sensor, a proximity sensor, and a red-green-blue (RGB) sensor (or an illumination sensor), but the sensor 1430 is not limited thereto. Each function of the sensors may be intuitively inferred by one of ordinary skill in the art from their names, and thus detailed descriptions thereof are omitted.

The control unit 1330 generally controls the overall operation of the device 110. For example, the control unit 1330 generally controls the information receiving unit 1310, the user input unit 1410, the output module 1420, the sensor 1430, the communication module 1440, the A/V input module 145, and the memory 1460 by executing programs which are stored in the memory 1460. The control unit 130 may be referred to as a processor that processes the function of the device 110.

When the plurality of items are displayed on the display 1320, if movement information is received via the information receiving unit 1310, the control unit 1330 may display pointing information which includes selection information which indicates a selection status of an item based on the received movement information and modified selection information which includes movement direction information which indicates a moving direction of a changed position on the display 1320 by overlapping with the item.

To display the pointing information, if the movement information is received, the control unit 1330 may change the position on the display 1320 by using information which relates to a reference coordinate of the display 1320 of the device 110 and the received movement information. The changed position on the display 1320 may be a position on the display 1320 which corresponds to the received movement information. The movement information may include at least one of a sensor value based on a movement of the remote control apparatus 120, similarly as the movement information described above with reference to FIG. 1, 2D coordinate information which corresponds to the sensor value, and a movement change information based on the 2D coordinate information which corresponds to the sensor value. The information which relates to the reference coordinate of the display 1320 of the device 110 may be stored in the memory 1460. The information which relates to the reference coordinate of the display 1320 is the same as described above with reference to FIG. 1.

In order to display the pointing information, if the movement information is received, the control unit 1330 may change the position on the display 1320 to a position which corresponds to the movement information by using the information which relates to the reference coordinate of the display 1320 and the received movement information, and may change the position on the display 1320 to the position which corresponds to the movement information by using information (2D coordinate information) which relates to the changed position on the display 1320 and layout information on the display 1320 which relates to the plurality of items.

The control unit 1330 may display pointing information which includes selection information or modified selection information that is displayed by overlapping with the item according to the position on the display 1320 as shown in FIGS. 4A through 4D and described above.

The control unit 1330 may display pointing information by selectively generating or setting a guide region for determining whether to maintain a selection of a selected item and a guide region for determining whether to select a non-selected item as shown in FIGS. 5, 6, 7, and 8 and described above.

The control unit 1330 may operate the device 110 according to the flowcharts shown in FIGS. 9, 11, and 12.

The control unit 1330 may control the operation of the device 110 according to a user input which is received via the user input unit 1410.

The communication module 1440 may include one or more constituent elements which are configured for enabling communication between the device 110 and the external device and/or between the device 110 and a server. For example, the communication module 1440 may include a short range wireless communicator 1441, a mobile communicator 1442, and a broadcasting receiver 1443.

The short range wireless communicator 1441 may include a component which is based on at least one of a Bluetooth communication, a Bluetooth low energy (BLE) communication, a near field communication, a WLAN (WiFi) communication, a Zigbee communication, an infrared data association (IrDA) communication, a WiFi direct (WFD) communication, an ultra wideband (UWB) communication, an Ant+ communication, etc., but the component included in the short range wireless communicator 1441 is not limited thereto.

The mobile communicator 1442 may transmit and receive a wireless signal to and from at least one of a base station, an external terminal, and a server over a mobile communication network. In this regard, the wireless signal may include any one or more of a voice call signal, a conference call signal, or various types of data according to transmission and reception of text and multimedia messages. When the device 110 is a television (TV), the user may attempt to call via the device 110 by using the mobile communicator 1442. The device 110 may not include the mobile communicator 1442 according to an implementation example.

The broadcasting receiver 1443 receives a broadcasting signal and/or information relating to broadcasting from the outside via a broadcasting channel. The broadcasting channel may include a satellite channel and/or a terrestrial broadcasting channel. The device 110 may not include the broadcasting receiver 1443 according to an implementation example.

The A/V input module 1450 which is used to input an audio signal and/or a video signal may include a camera 1451 and a microphone 1452, but a component included in the A/V input module 1450 is not limited thereto. The camera 1451 may obtain an image frame, such as a still image or a moving image, via an image sensor in a conference call mode or a photographing mode. The camera 1451 may obtain an image of the remote control apparatus 120 in order to provide the movement information of the remote control apparatus 120 to the control unit 1330. The movement information of the remote control apparatus 120 may be obtained by using a user's finger gesture image which is obtained by using the camera 1451. The image captured by the image sensor may be processed by the control unit 1330 and/or a separate image processing unit (not shown).

The image frame processed by the camera 1451 may be stored in the memory 1460 or may be transmitted to the outside via the communication module 1440. The A/V input module 1450 may include two or more cameras according to a structure of the device 110.

The microphone 1452 receives an external sound signal, converts the external sound signal into electric voice data, and transmits the electric voice data to the control unit 1330. The microphone 1452 may receive a sound signal of an external device and/or a voice signal of a user who is located in relatively close proximity to the device 110. The microphone 1452 may use any one or more of various noise removal algorithms for removing noise generated during a process of receiving the external sound signal or the external voice signal.

The memory 1460 may store programs for processing and controlling the control unit 1330, and may store a plurality of items that may be displayed on the display 1320.

The memory 1460 may include at least one type of storage medium, such as a flash memory type, a hard disk type, a multimedia card micro type, a card type memory (for example, SD, XD memory, etc.), random access memory (RAM), static RAM (SRAM), read-only memory (ROM), electrically erasable programmable read-only memory (EEPROM), programmable ROM (PROM), magnetic memory, a magnetic disk, and an optical disk. The device 110 may use web storage or a cloud server that performs a storage function of the memory 1460 on the Internet. In this case, information which relates to the plurality of items that may be displayed on the display 1320 may be provided from the web storage or the cloud server.

The programs stored in the memory 1460 may be classified into a plurality of modules according to their functions, for example, a user interface (UI) module 1461, an alarm module 1462, an application module 1463, etc. but the plurality of modules are not limited thereto. For example, when the display 1320 is combined with a touch panel layer, the plurality of modules may include a touch screen module.

The UI module 1461 may include the layout information on the display 1320 which relates to the plurality of items described in an exemplary embodiment. The UI module 1461 may provide the layout information on the display 1320 which relates to the plurality of items to the control unit 1330 according to a request of the control unit 1330. The UI module 1461 may provide a UI, a graphical user interface (GUI), etc., for overlapping pointing information according to an exemplary embodiment, to an item to the control unit 1330. The UI module 1461 may provide a specialized UI, GUI, etc. that are linked with the device 110 for each application.

The alarm module 1462 may generate a signal for notifying a user about an occurrence of an event of the device 110. An example of the event that occurs in the device 110 may include any one or more of a selection of an item, power on/off of the device 110, an error of received information (movement information), etc. but the event that occurs in the device 110 is not limited thereto. The alarm module 1462 may generate a signal for notifying a user about the selection of the item every time a selected item is changed, but a notifying signal generated by the alarm module 1462 is not limited thereto.

The alarm module 1462 may output a video alarm signal via the display 1320 and an audio alarm signal via the sound output unit 1421, but an output type of alarm signal is not limited thereto.

The application module 1463 may include any one or more of various applications which are set in the device 110 as described above with reference to FIG. 1.

Figure 15:
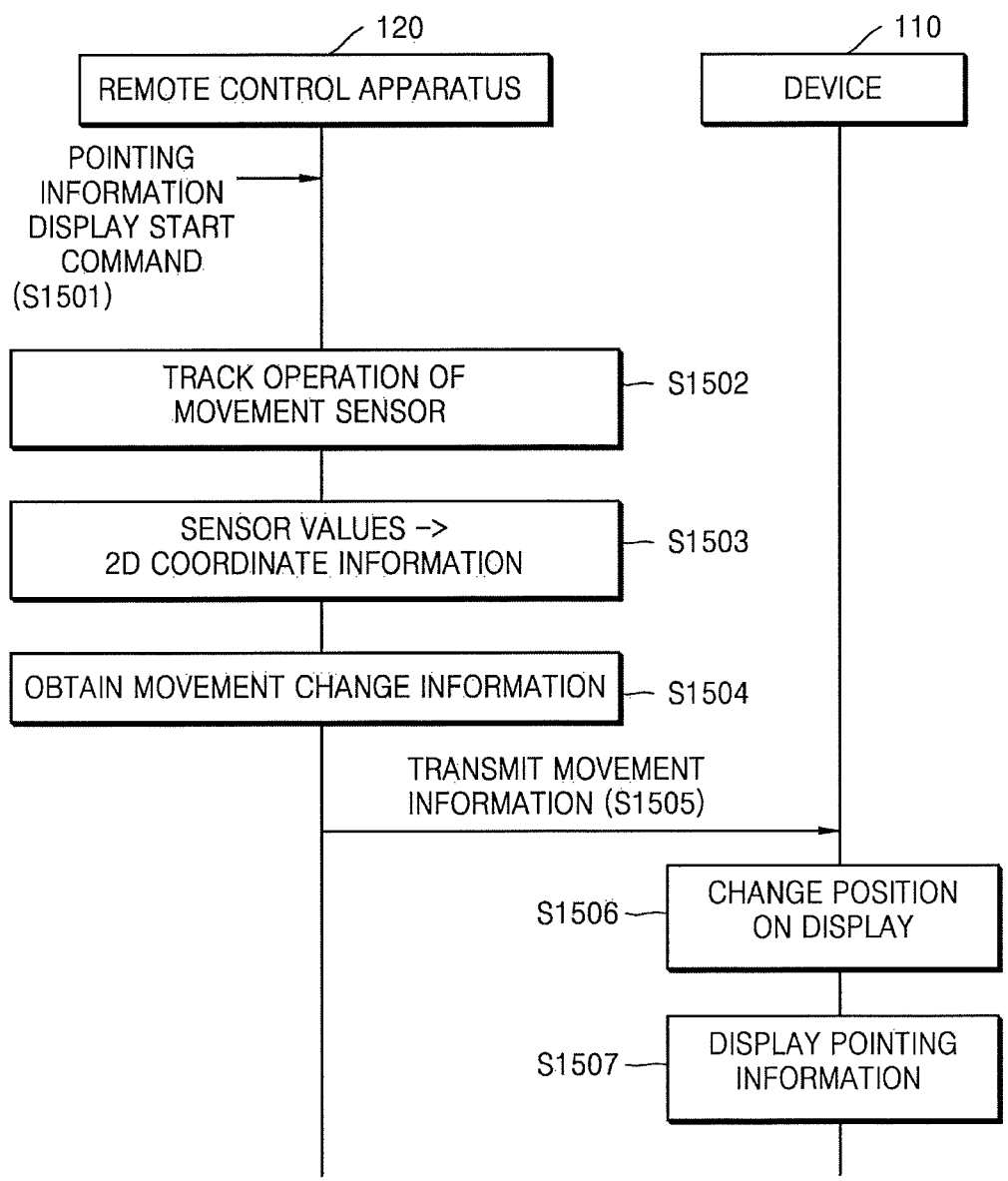
FIG. 15 is a flowchart of a method for displaying pointing information, according to another exemplary embodiment.

FIG. 15 is a flowchart of a method for displaying pointing information based on operations of the remote control apparatus 120 and the device 110, according to another exemplary embodiment. In FIG. 15, movement information which relates to the remote control apparatus, including movement change information which relates to the remote control apparatus 120, is transmitted to the device 110.

In operation S1501 of FIG. 15, if a pointing information display start command is input, the remote control apparatus 120 tracks an operation of the movement sensor 121 in operation S1502. If the movement sensor 121 is a 3 axis acceleration sensor as described above with reference to FIG. 1, tracking of the operation of the movement sensor 121 may include monitoring of sensor values (x axis sensor value, y axis sensor value, and z axis sensor value) which are output by the 3 axis acceleration sensor.

In operation S1503, the remote control apparatus 120 converts the sensor values into 2D coordinate information. If the sensor values are 3 axis sensor values as described above, converting of the sensor values into 2D coordinate information may be performed, for example, by using a method for converting 3D coordinate information into the 2D coordinate information.

In operation S1504, the remote control apparatus 120 obtains the movement change information which relates to the remote control apparatus 120 by using the 2D coordinate information. The movement change information which relates to the remote control apparatus 120 may be obtained as described above with reference to FIG. 1.

In operation S1505, the remote control apparatus 120 transmits the movement information which includes the movement change information to the device 110. In operation S1506, the device 110 changes a position on the display 1320 by using the received movement information. The changed position on the display 1320 may be a position which corresponds to the received movement information. When the position on the display 1320 is changed by using the received movement information, as described above with reference to FIGS. 1 and 14, the device 110 may use at least one of information which relates to a reference coordinate of the display 1320 and layout information which relates to an item displayed on the display 1320.

In operation S1507, the device 110 overlaps pointing information which includes selection information or modified selection information which is determined according to the position on the display 1320 with the item, and displays the item and the pointing information on the display 1320. The selection information and/or the modified selection information may be displayed according to the received movement information as shown in FIGS. 4A, 4B, 5, 6, 7, and/or 8. In particular, the device 110 may read pointing information (including the selection information and/or the modified selection information) previously stored in the memory 1450 according to the received movement information, and may display the pointing information and the selected item by overlapping the pointing information with the selected item displayed on the display 1320.

When the pointing information previously stored in the memory 1450 is used, the position on the display 1320 which corresponds to the received movement information may be processed as an approximate position. For example, if the changed position on the display 1320 according to the received movement information is determined to be disposed outside an outline of a selected item in a north direction (or in an upper direction), the device 110 reads the pointing information 444 of FIG. 4C from the memory 1450, and displays the pointing information 444 and the selected item on the display 1320 by overlapping the pointing information 444 with the selected item displayed on the display 1320 irrespective of an actual position on the display 1320 which corresponds to the received movement information. If the changed position on the display 1320 according to the received movement information is determined to go beyond a corner of the selected item in a northwest direction, the device 110 reads the pointing information 440 of FIG. 4C from the memory 1450, and displays the pointing information 440 and the selected item on the display 1320 by overlapping the pointing information 440 with the selected item displayed on the display 1320 irrespective of the actual position on the display unit 1320 which corresponds to the received movement information.

As described above, information used to determine the position on the display 1320 based on the selected item may be stored in the memory 1450. When the item is a rectangular shape as shown in FIGS. 4A, 4B, 4C, and 4D, to determine the position on the display 1320, information classified as a north direction (an upper direction), a northeast direction, an east direction (a right direction), a southeast direction, a south direction (a lower direction), a southwest direction, a west direction (a left direction), and a northwest direction may be stored in the memory 1450, but information used to determine the position on the display 1320 stored in the memory 1450 is not limited thereto with respect to the item. For example, information classified as the upper direction, the lower direction, the left direction, and the right direction with respect to the item may be stored in the memory 1450 in order to determine the position on the display 1320 based on the selected item.

FIG. 15 may be modified so that the movement information transmitted from the remote control apparatus 120 to the device 110 includes sensor values which are output by the movement sensor 121, 2D coordinate information which corresponds to the sensor values, or the sensor values, the 2D coordinate information which corresponds to the sensor values, and movement change information obtained by using the 2D coordinate information which corresponds to the sensor values. An operation of changing the position on the display 1320 performed by the device 110 may be changed according to information included in the received movement information.

The remote control apparatus 120 may determine the information included in the movement information transmitted according to a function of the device 110. To this end, the remote control apparatus 120 may collect information which relates to the function of the device 110 or receive the information which relates to the function of the device 110 from the device 110 or a server (not shown) before performing an operation of displaying the pointing information. The remote control apparatus 120 may determine the information which is included in the movement information transmitted to the device 110 according to a request of the device 110.

The device 110 according to an exemplary embodiment overlaps a selected item with pointing information which includes selection information which indicates a selection status of the selected item via the display 1320 based on a movement of the remote control apparatus 120 and/or modified selection information in which a part of the selection information is modified according to a moving direction of a changed position on the display 1320, and displays the selected item and the pointing information, and thus a user may intuitively determine the selected item, the position on the display 1320, and the moving direction of the changed position on the display 1320.

The method may be performed by program commands that may be executed in a computer and may be recorded on a transitory or non-transitory computer-readable recording medium. Examples of the computer-readable recording medium include program commands, data files, data structures, and the like in a single or combination form. The program commands recorded on the computer-readable recording medium may be particularly designed and configured for one or more exemplary embodiments or may be well-known to one of ordinary skill in computer software. Examples of the computer-readable recording mediums include hardware devices that are particularly configured to store and execute program commands, such as hard disks, floppy disks, magnetic media, such as magnetic tapes, optical media, such as CD-ROMs or DVDs, magneto-optical media, such as floptical disks, read-only memory (ROM), random-access memory (RAM), flash memory, etc. Examples of the program commands include advanced language codes that may be executed in a computer by using an interpreter, as well as mechanical language codes that are made by a compiler.

While the present inventive concept has been particularly shown and described with reference to exemplary embodiments thereof, it will be understood by those of ordinary skill in the art that various changes in form and details may be made herein without departing from the spirit and scope of the present inventive concept as defined by the following claims.

What is claimed is:

1. A method for displaying pointing information, the method comprising:
   displaying, on a display, a plurality of items and a selection image indicating a selected item from among the plurality of items;
   receiving movement information which relates to a remote control apparatus from the remote control apparatus; and
   if a position on the display which corresponds to the movement information is moved, modifying the selection image,
   wherein the modified selection image comprises movement direction information which indicates a moving direction of the position on the display.

2. A non-transitory computer readable recording medium having recorded thereon a program for executing the method of claim 1.

3. The method of claim 1, wherein the movement direction information is displayed as a result of the modifying the selection image.

4. The method of claim 1, wherein the movement direction information is provided by displaying a part of the selection image that corresponds to the position differently from a remaining part of the selection image.

5. The method of claim 1, wherein the movement direction information is provided by displaying a part of the selection image that corresponds to the position to have a first thickness and displaying a remaining part of the selection image to have a second thickness which is different from the first thickness.

6. A device comprising:
   an information receiver configured to receive movement information from a remote control apparatus;
   a display; and
   a controller configured to control the display to display a plurality of items in conjunction with a selection image indicating a selected item from among the plurality of items, to receive movement information which relates to the remote control apparatus via the information receiver, and, if a position on the display which corresponds to the movement information is moved, to modify the selection image,
   wherein the modified selection image comprises movement direction information which indicates a moving direction of the position on the display.

7. The device of claim 6, wherein the controller is further configured to control the display to display the movement direction information is as a result of a modification of the selection image.

8. The device of claim 6, wherein the controller is further configured to control the display to display the movement direction information by displaying a part of the selection image that corresponds to the position differently from a remaining part of the selection image.

9. The device of claim 6, wherein the controller is further configured to control the display to display the movement direction information by displaying a part of the selection image that corresponds to the position to have a first thickness and to display a remaining part of the selection image to have a second thickness which is different from the first thickness.

10. A display device comprising:
    a receiver configured to receive control information from a remote control apparatus;
    a display; and
    a controller configured to control the display to display a plurality of graphic items in conjunction with a selection image indicating a selected graphic item from among the plurality of graphic items,
    wherein when the received control information relates to controlling a virtual pointing position while the selection image is displayed, the controller is further configured to modify the selection image by controlling the display to display a part of the selection image that corresponds to the virtual pointing position differently in appearance from a remaining part of the selection image, according to the virtual pointing position that is based on the received control information.

11. The display device of claim 10, wherein the selection image is displayed on a boundary of the selected graphic item.

12. The display device of claim 11, wherein the controller is further configured to modify the selection image by controlling the display to display a part of the selection image that corresponds to the virtual pointing position to have a first thickness and to display a remaining part of the selection image to have a second thickness which is different from the first thickness.

13. The display device of claim 11, wherein the selection image comprises top and bottom horizontal linear sections, and left and right vertical linear sections surrounding the selected graphic item, and
    the controller is further configured to change a shape of at least one of the linear sections of the selection image by controlling the display to display a part of one of the linear sections of the selection image that corresponds to the virtual pointing position to have a first thickness and to display a remaining part of the one of linear sections of the selection image to have a second thickness which is different from the first thickness.

14. The display device of claim 13, wherein in response to a movement of the virtual pointing position, the controller is further configured to change position of the thicker part of the one of linear section.

15. The display device of claim 10, wherein the selection image is displayed as an outline of the selected graphic item.

16. The display device of claim 10, wherein the controller is further configured to modify the selection image to indicate the virtual pointing position to a user.

17. The display device of claim 10, wherein the controller is further configured to modify the selection image by providing a highlight effect to a part of the selection image that corresponds to the virtual pointing position.

18. The display device of claim 10, wherein the controller is further configured to modify the selection image by providing a glow effect to a part of the selection image that corresponds to the virtual pointing position.

19. The display device of claim 10, wherein the part of the selection image to be modified is determined based on the virtual pointing position.

20. The display device of claim 10, wherein the selection image overlaps with at least a part of the selected graphic item.

21. The display device of claim 10, wherein a pointing cursor corresponding to the virtual pointing position is not displayed on the display.

22. A display device comprising:
   a receiver configured to receive control information from a remote control apparatus;
   a display; and
   a controller configured to control the display to display a plurality of graphic items in conjunction with a boundary image indicating a highlighted graphic item from among the plurality of graphic items, to determine a virtual pointing position according to the received control information and to control the display to display a part of the boundary image that corresponds to the determined virtual pointing position to have a first thickness and to display a remaining part of the boundary image to have a second thickness which is different from the first thickness.

23. The display device of claim 22, wherein the boundary image overlaps with at least a part of the selected graphic item.

24. The display device of claim 22, wherein the controller is further configured to control the display to display the part of the boundary image that corresponds to the determined virtual pointing position with a highlight effect, and
   wherein a location of the highlighted effect is moved according to a movement of the determined virtual pointing position.

25. The display device of claim 22, wherein the controller is further configured to control the display to display the part of the boundary image that corresponds to the determined pointing position with a glow effect, and
   wherein a location of the glow effect is moved according to a movement of the determined virtual pointing position.

26. The display device of claim 22, wherein the part of the boundary image that corresponds to the determined pointing position is determined based on a relation between the determined virtual pointing position and the highlighted graphic item.

27. The display device of claim 22, wherein the part of the boundary image that corresponds to the determined pointing position is determined based on a relative position of the determined virtual pointing position with respect to the highlighted graphic item.

28. The display device of claim 22, wherein a pointing cursor corresponding to the virtual pointing position is not displayed on the display.

29. The display device of claim 22, wherein the boundary image comprises top and bottom horizontal linear sections, and left and right vertical linear sections surrounding the highlighted graphic item, and
   the controller is further configured to change a shape of at least one of the linear sections of the boundary image by controlling the display to display a part of one of the linear sections of the boundary image that corresponds to the virtual pointing position to have a first thickness and to display a remaining part of the one of linear sections of the boundary image to have a second thickness which is different from the first thickness.

30. The display device of claim 29, wherein in response to a movement of the virtual pointing position, the controller is further configured to change position of the thicker part of the one of linear section.

\* \* \* \* \*